(12) United States Patent
Zhang et al.

(10) Patent No.: US 11,808,846 B2
(45) Date of Patent: Nov. 7, 2023

(54) ANGLE-FINDING PROCESS FOR SPARSE UNIFORM ARRAYS

(71) Applicant: Aptiv Technologies Limited, St. Michael (BB)

(72) Inventors: Yu Zhang, Thousand Oaks, CA (US); Zhengzheng Li, Agoura Hills, CA (US); Xin Zhang, Agoura Hills, CA (US)

(73) Assignee: Aptiv Technologies Limited, St. Michael (BB)

( * ) Notice: Subject to any disclaimer, the term of this patent is extended or adjusted under 35 U.S.C. 154(b) by 312 days.

(21) Appl. No.: 17/328,912

(22) Filed: May 24, 2021

(65) Prior Publication Data

US 2022/0260708 A1 Aug. 18, 2022

Related U.S. Application Data

(60) Provisional application No. 63/148,943, filed on Feb. 12, 2021.

(51) Int. Cl.
*G01S 13/931* (2020.01)
(52) U.S. Cl.
CPC .................. *G01S 13/931* (2013.01)
(58) Field of Classification Search
CPC ..................................................... G01S 13/931
See application file for complete search history.

(56) References Cited

U.S. PATENT DOCUMENTS

| 5,657,027 A | 8/1997 | Guymon |
| 7,474,262 B2 | 1/2009 | Alland |

(Continued)

FOREIGN PATENT DOCUMENTS

| CN | 106772224 A | 5/2017 |
| CN | 111239678 A | 6/2020 |

(Continued)

OTHER PUBLICATIONS

M. D. Zoltowski and K. T. Wong, "ESPRIT-based 2-D direction finding with a sparse uniform array of electromagnetic vector sensors," in IEEE Transactions on Signal Processing, vol. 48, No. 8, pp. 2195-2204, Aug. 2000, doi: 10.1109/78.852000. (Year: 2000).*

(Continued)

*Primary Examiner* — Marcus E Windrich
(74) *Attorney, Agent, or Firm* — Sawtooth Patent Group PLLC

(57) ABSTRACT

This document describes techniques and systems of a radar system with an angle-finding process for sparse uniform arrays. The described radar system includes a processor and an antenna that can receive electromagnetic energy reflected by objects in the surrounding environment. The antenna includes a one-dimensional (1D) or two-dimensional (2D) sparse array. The processor can determine, using the received electromagnetic energy, a signal subspace associated with the objects that includes an invariance equation. Using an estimated solution to the invariance equation, the processor determines a solution to the invariance equation. The solution to the invariance equation is used to determine angular phases associated with the objects. The processor can then determine, using the angular phases, angles associated with the objects. In this way, the described angle-finding process enables the radar system with a sparse array to efficiently determine angles associated with objects without blind spots.

20 Claims, 9 Drawing Sheets

(56) References Cited

U.S. PATENT DOCUMENTS

| | | | |
|---|---|---|---|
| 7,639,171 B2* | 12/2009 | Alland | H01Q 3/24 |
| | | | 342/25 R |
| 9,395,727 B1 | 7/2016 | Smith et al. | |
| 9,869,762 B1 | 1/2018 | Alland et al. | |
| 10,416,680 B2 | 9/2019 | Li et al. | |
| 10,446,923 B2 | 10/2019 | Watson | |
| 10,809,737 B2 | 10/2020 | Li et al. | |
| 10,866,304 B1* | 12/2020 | Hassibi | G01S 13/26 |
| 11,619,705 B2* | 4/2023 | Zhang | H01Q 21/061 |
| | | | 342/157 |
| 11,635,506 B2 | 4/2023 | Iwasa et al. | |
| 2017/0149147 A1 | 5/2017 | Minami et al. | |
| 2018/0149736 A1* | 5/2018 | Alland | H01Q 21/28 |
| 2019/0285738 A1 | 9/2019 | Iwasa et al. | |
| 2019/0324133 A1* | 10/2019 | Hong | G01S 7/42 |
| 2020/0004262 A1 | 1/2020 | Li et al. | |
| 2020/0256947 A1 | 8/2020 | Motoda | |
| 2020/0309899 A1* | 10/2020 | Jonas | G01S 13/931 |
| 2021/0373144 A1 | 12/2021 | Amani et al. | |
| 2022/0163623 A1 | 5/2022 | Kishigami et al. | |
| 2022/0236370 A1 | 7/2022 | Li et al. | |

FOREIGN PATENT DOCUMENTS

| | | |
|---|---|---|
| EP | 2662699 A1 | 11/2013 |
| EP | 3757607 A1 | 12/2020 |
| EP | 4036600 A1 | 8/2022 |
| EP | 4043919 A1 | 8/2022 |
| JP | 6523350 B2 | 5/2019 |
| JP | 2020186972 A | 11/2020 |
| WO | 2021096889 A1 | 5/2021 |

OTHER PUBLICATIONS

"Extended European Search Report", EP Application No. 21196393. 9, dated Feb. 28, 2022, 11 pages.
"Extended European Search Report", EP Application No. 21196394. 7, dated Mar. 4, 2022, 11 pages.
"Extended European Search Report", EP Application No. 21215410. 8, dated Jul. 12, 2022, 9 pages.
"Extended European Search Report", EP Application No. 21216322. 4, dated Jun. 3, 2022, 9 pages.
Amin, et al., "Sparse Arrays and Sampling for Interference Mitigation and DOA Estimation in GNSS" Proceedings of the IEEE, vol. 104, No. 6, Jun. 2016, pp. 1302-1317.
Gu, et al., "Adaptive Beamforming via Sparsity-Based Reconstruction of Covariance Matrix", Compressed Sensing in Radar Signal Processing, 2019, 33 pages.
Gu, et al., "Robust Adaptive Beamforming Based on Interference Covariance Matrix Reconstruction and Steering Vector Estimation", IEEE Transactions on Signal Processing, vol. 60, No. 7, Jul. 2012, pp. 3881-3885.
Gu, et al., "Robust Adaptive Beamforming Based on Interference Covariance Matrix Sparse Reconstruction", Signal Processing, vol. 96, Mar. 1, 2014, pp. 375-381.
Steinwandt, et al., "Performance Analysis of ESPRIT-Type Algorithms for Co-Array Structures", Dec. 10, 2017, 5 pages.
Zhou, et al., "A Robust and Efficient Algorithm for Coprime Array Adaptive Beamforming", IEEE Transactions on Vehicular Technology, vol. 67, No. 2, Feb. 2018, pp. 1099-1112.
Zoltowski, et al., "ESPRIT-Based 2-D Direction Finding with a Sparse Uniform Array of Electromagnetic Vector Sensors", Aug. 1, 2000, pp. 2195-2204.
Pursuant to MPEP § 2001.6(b) the applicant brings the following co-pending application to the Examiner's attention: U.S. Appl. No. 17/075,632.
Chen, et al., "A new method for joint DOD and DOA estimation in bistatic MIMO radar", Feb. 2010, pp. 714-718.
Engels, et al., "Automotive MIMO Radar Angle Estimation in the Presence of Multipath", Oct. 2017, 5 pages.
Gu, et al., "Joint SVD of Two Cross-Correlation Matrices to Achieve Automatic Pairing in 2-D Angle Estimation Problems", IEEE Antennas and Wireless Propagation Letters, vol. 6, pp. 553-556, 2007, 2007, 4 pages.
Haardt, et al., "Unitary ESPRIT: How to Obtain Increased Estimation Accuracy with a Reduced Computational Burden", May 1995, 1232-1242.
Jiang, et al., "Joint DOD and DOA Estimation for Bistatic MIMO Radar in Unknown Correlated Noise", Nov. 2015, 5113-5125.
Jin, "Joint DOD and DOA estimation for bistatic MIMO radar", Feb. 2009, pp. 244-251.
Kikuchi, et al., "Pair-Matching Method for Estimating 2-D Angle of Arrival With a Cross-Correlation Matrix", IEEE Antennas and Wireless Propagation Letters, vol. 5, pp. 35-40, 2006, Jan. 2007, 6 pages.
Moffet, "Minimum-Redundancy Linear Arrays", IEEE Transactions on Antennas and Propagation, vol. AP-16, No. 2., Mar. 1968, pp. 172-175.
Roy, et al., "ESPRIT-Estimation of Signal Parameters Via Rotational Invariance Techniques", Jul. 1989, pp. 984-995.
Sun, et al., "MIMO Radar for Advanced Driver-Assistance Systems and Autonomous Driving: Advantages and challenges", Jul. 2020, pp. 98-117.
Tropp, et al., "Signal Recovery From Random Measurements Via Orthogonal Matching Pursuit", IEEE Transactions on Information Theory, vol. 53, No. 12, Dec. 2007, pp. 4655-4666, Dec. 2007, 12 pages.
Vaidyanathan, et al., "Sparse Sensing with Co-Prime Samplers and Arrays", IEEE Trans. Signal Process., vol. 59, No. 2,, Feb. 2011, pp. 573-586.
Van Trees, "Planar Arrays and Apertures", Essay in "Detection, Estimation, and Modulation Theory, Optimum Array Processing", pp. 231-274. Wiley-Interscience, 2001., 2001, 44 pages.
Visentin, et al., "Analysis of Multipath and DOA Detection Using a Fully Polarimetric Automotive Radar", Oct. 2017, 5 pages.
Wang, et al., "Two-Dimensional Beamforming Automotive Radar with Orthogonal Linear Arrays", 2019 IEEE Radar Conference, Boston, MA, Apr. 22-26, 2019., 2019, 6 pages.
Zoltowski, et al., "Closed-Form 2-D Angle Estimation with Rectangular Arrays in Element Space or Beamspace via Unitary ESPRIT", Feb. 1996, pp. 316-328.
Feger, et al., "A 77-GHz FMCW MIMO Radar Based on an SiGe Single-Chip Transceiver", IEEE Transactions on Microwave Theory and Techniques, vol. 57, No. 5, May 2009, pp. 1020-1035.
Razavi-Ghods, "Characterisation of MIMO Radio Propagation Channels", Durham theses, Durham University. Available at Durham E-Theses Online: http://etheses.dur.ac.uk/2526/ (Year: 2007), 349 pages.
Yu, et al., "MIMO Adaptive Beamforming for Nonseparable Multipath Clutter Mitigation", IEEE Transactions on Aerospace and Electronic Systems, vol. 50, No. 4, Oct. 2014, pp. 2604-2618.
"Extended European Search Report", EP Application No. 22200994. 6, dated Aug. 11, 2023, 15 pages.
Wu, et al., "A Low Complexity Adaptive Algorithm for Eigenspace-Based Two-Dimensional Direction of Arrival Tracking", IEICE Transactions on Fundamentals of Electronics, Communications and Computer Sciences, vol. E92-A, No. 8, Aug. 1, 2019, pp. 2097-2106.
"Extended European Search Report", EP Application No. 22197753. 1, dated Mar. 7, 2023, 17 pages.
Zhang, et al., "Flexible Array Response Control via Oblique Projection", IEEE Transactions on Signal Processing, vol. 67, No. 12, Jun. 15, 2019, pp. 3126-3139.
"Extended European Search Report", EP Application No. 23158330. 3, dated Aug. 25, 2023, 17 pages.
"Extended European Search Report", EP Application No. 23165460. 9, dated Sep. 15, 2023, 16 pages.

* cited by examiner

ANGLE-FINDING PROCESS FOR SPARSE UNIFORM ARRAYS

CROSS-REFERENCE TO RELATED APPLICATION

This application claims the benefit under 35 U.S.C. 119(e) of U.S. Provisional Application No. 63/148,943, filed Feb. 12, 2021, the disclosure of which is incorporated by reference in its entirety herein.

BACKGROUND

Radar systems use antennas to transmit and receive electromagnetic (EM) signals for detecting and tracking objects. In automotive applications, radar antennas can include one-dimensional (1D) or two-dimensional (2D) arrays to measure an azimuth angle and/or elevation angle associated with the objects. Some radar systems use the estimation of signal parameters via rotational invariant techniques (ESPRIT) or unitary ESPRIT to discriminate multiple objects in the same range-Doppler bin. The angular resolution, however, is generally proportional to the aperture size of the array. Sparse 1D and 2D arrays can provide a large aperture, but some angle-finding processes, including unitary ESPRIT, can have one or more blind spots.

SUMMARY

This document describes techniques and systems of a radar system with an angle-finding process for sparse uniform arrays. Although using sparse antenna arrays, the described angle-finding process enables an example radar system to efficiently process radar data to determine angles associated with objects without blind spots attributed to other angle-finding processes. In this way, even with fewer antenna elements than a traditional radar system, the described radar system and angle-finding process can have a comparable angular resolution at a lower cost and lower complexity level. For example, a radar system includes a processor and an antenna that can receive electromagnetic energy reflected by one or more objects. The antenna includes a one-dimensional (1D) (e.g., linear) or two-dimensional (2D) sparse array of antenna elements. The processor can determine, using electromagnetic energy received by the 1D or 2D sparse array, a signal subspace associated with the one or more objects that includes an invariance equation. Using an estimated solution to the invariance equation, the processor determines a solution to the invariance equation. The solution to the invariance equation is used to determine angular phases associated with the one or more objects. The processor can then determine, using the angular phases, angles associated with the one or more objects.

This document also describes methods performed by the above-summarized system and other configurations of the radar system set forth herein, as well as means for performing these methods.

This Summary introduces simplified concepts related to a radar system with an angle-finding process for sparse uniform arrays, which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of a radar system with an angle-finding process for sparse uniform arrays are described in this document with reference to the following figures. The same numbers are often used throughout the drawings to reference like features and components:

FIGS. 2-1 through 2-4 illustrate example sparse uniform antenna arrays of a radar system with an angle-finding process;

FIG. 3 illustrates an example environment in which a radar system uses an angle-finding module to perform an angle-finding process for sparse uniform arrays;

FIG. 4 illustrates an example flow diagram of a radar system with an angle-finding process for sparse uniform linear arrays;

DETAILED DESCRIPTION

Overview

Figure 1:
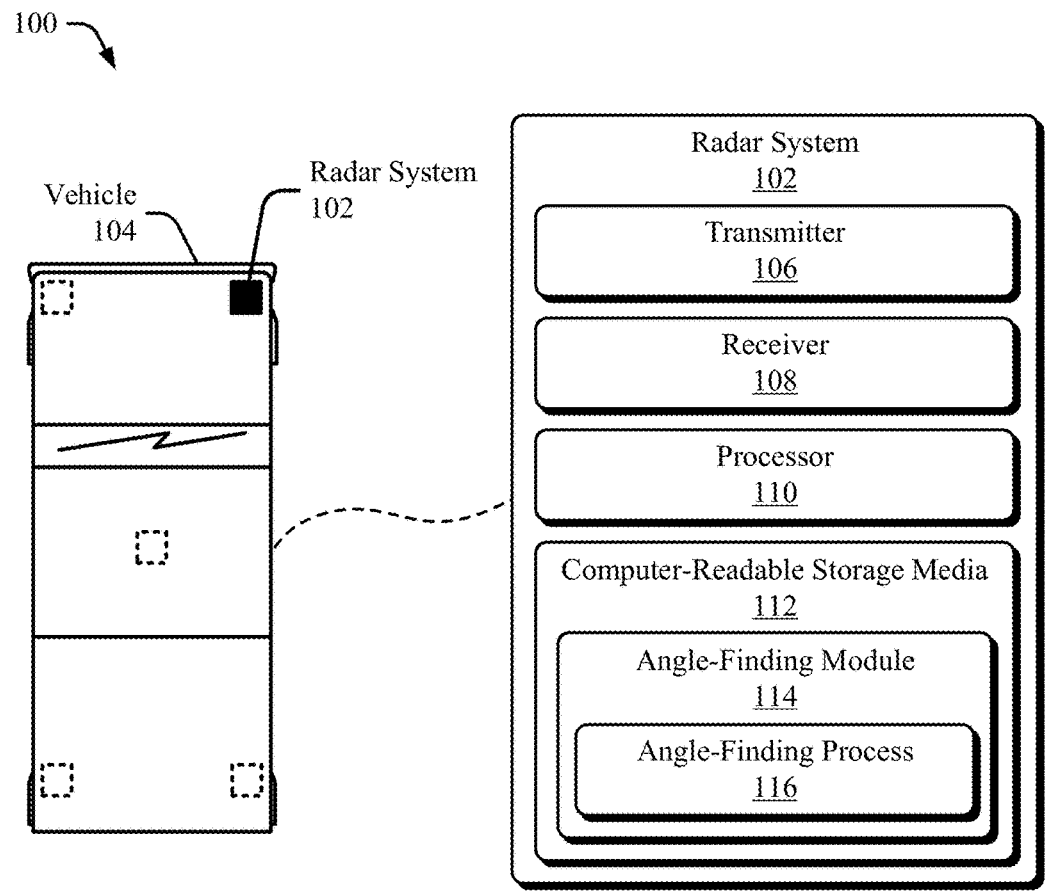
FIG. 1 illustrates an example environment in which a radar system with an angle-finding process for sparse uniform arrays can be implemented.
Figure 1:
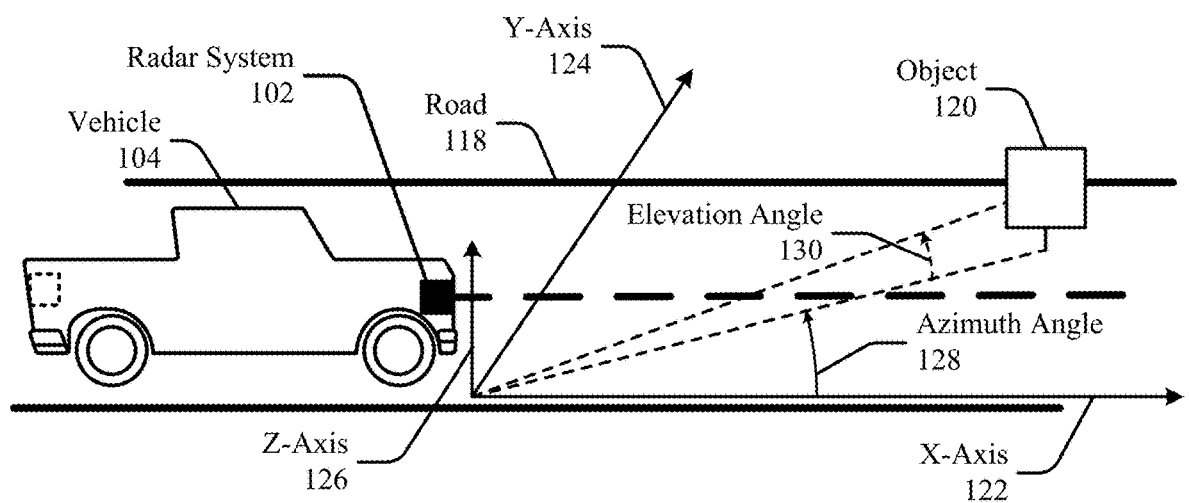

Radar systems can be configured as an important sensing technology that vehicle-based systems use to acquire information about the surrounding environment. For example, vehicle-based systems can use radar systems to detect objects in or near roadways and, if necessary, depend on a radar system output to take actions (e.g., reduce speed, change lanes) to avoid a collision.

Radar systems generally include at least two antennas to transmit and receive EM radiation. Some automotive radar systems operate multiple-input and multiple-output (MIMO) radars to obtain reliable detections of objects. These systems can include a receive antenna with a one-dimensional (1D) or two-dimensional (2D) array of antenna elements to measure the azimuth angle and/or the elevation angle associated with objects. Although a large aperture in the azimuth direction and/or the elevation direction of the receive antenna can improve the angular resolution, the larger aperture can also increase the number of antenna elements and the cost of the radar system. As a result, some radar systems use sparse 1D and/or 2D arrays to improve the angular resolution of the radar system without increased costs.

Radar systems can use various angle-finding processes to estimate the angles associated with objects. For example, a radar system can use ESPRIT techniques, which are super-resolution direction-of-arrival (DoA) estimation algorithms, to estimate angles associated with objects. The eigenvalue decomposition of the complex covariance matrix in ESPRIT techniques is generally not computationally efficient, making them less suitable for automotive applications.

Other radar systems use unitary ESPRIT algorithms that employ more efficient real-valued computations. For example, real-time embedded radar systems (e.g., automotive radar systems) can use unitary ESPRIT as a super-resolution DoA estimation algorithm. Unitary ESPRIT provides stable angle estimates for radar systems with dense uniform linear arrays (ULAs). If the radar system uses sparse uniform linear arrays, unitary ESPRIT and potentially other angle-finding processes can include computational blind spots for certain angles within the field-of-view of the radar system. For example, suppose an object is located at a problematic angle. In that case, these radar systems are generally unable to detect the object, resulting in potentially unsafe driving conditions.

In contrast, this document describes techniques and systems to provide an angle-finding process for sparse uniform linear arrays or sparse uniform 2-D arrays. For example, a radar system can include an antenna that can receive EM energy reflected by one or more objects. The antenna can include a 1D or 2D subarray of antenna elements. The radar system can also include one or more processors that can determine, using electromagnetic energy received by the 1D or 2D sparse array, a signal subspace associated with the one or more objects that includes an invariance equation. Using an estimated solution to the invariance equation, the processor determines a solution to the invariance equation. The solution to the invariance equation is used by the processor to determine angular phases associated with the one or more objects. In this way, the described systems and techniques can reduce the number of antenna elements by using a sparse array while avoiding blind spots that can occur from processing radar data from sparse arrays.

This is just one example of the described techniques and systems of a radar system with an angle-finding process for sparse uniform linear arrays or sparse uniform 2-D arrays. This document describes other examples and implementations.

Operating Environment

FIG. 1 illustrates an example environment 100 in which a radar system 102 with an angle-finding process for sparse uniform arrays can be implemented. In the depicted environment 100, the radar system 102 is mounted to, or integrated within, a vehicle 104. The radar system 102 can detect one or more objects 120 in the vicinity of the vehicle 104 in or on road 118. Although illustrated as a car, the vehicle 104 can represent other types of automobiles or motorized vehicles (e.g., a motorcycle, a bus, a tractor, a semi-trailer truck), non-motorized vehicles (e.g., a bicycle), railed vehicles (e.g., a train), watercraft (e.g., a boat), aircraft (e.g., an airplane), or spacecraft (e.g., satellite). In general, manufacturers can mount the radar system 102 to any moving platform, including moving machinery or robotic equipment.

The radar system 102 can detect the object 120 from any exterior surface of the vehicle 104. For example, vehicle manufacturers can integrate the radar system 102 into a bumper, side mirror, headlights, rear lights, or any other interior or exterior location where the object 120 requires detection. In the depicted implementation, the radar system 102 is mounted on the front of the vehicle 104 and illuminates the object 120. In some cases, the vehicle 104 includes multiple radar systems 102, such as a first radar system 102 and a second radar system 102, that provide a larger field-of-view.

In general, vehicle manufacturers can design the locations of the one or more radar systems 102 to provide a particular field-of-view that encompasses a region of interest. Example fields-of-view include a 360-degree field-of-view, one or more 180-degree fields-of-view, one or more 90-degree fields-of-view, and so forth, which can overlap or be combined into a field-of-view of a particular size.

The object 120 is composed of one or more materials that reflect radar signals. Depending on the application, the object 120 can represent a target of interest. In some cases, the object 120 can be a moving object (e.g., another vehicle) or a stationary object (e.g., a roadside sign).

The radar system 102 emits EM radiation by transmitting EM signals or waveforms via antenna elements. In the environment 100, the radar system 102 can detect and track the object 120 by transmitting and receiving one or more radar signals. For example, the radar system 102 can transmit EM signals between one hundred and four hundred gigahertz (GHz), between four and one hundred GHz, or between approximately seventy and eighty GHz.

The radar system 102 can include a transmitter 106 and at least one antenna to transmit EM signals. The radar system 102 can also include a receiver 108 and the at least one antenna to receive reflected versions of the EM signals. The transmitter 106 includes one or more components for emitting the EM signals. The receiver 108 includes one or more components for receiving the reflected EM signals. The transmitter 106 and the receiver 108 can include a sparse linear or one-dimensional (1D) array of antenna elements and/or a sparse two-dimensional (2D) array of antenna elements. The use of sparse arrays improves the angular resolution of the radar system 102 without increasing the cost and computational complexity associated with additional antenna elements. The transmitter 106 and the receiver 108 can be incorporated together on the same integrated circuit (e.g., a transceiver integrated circuit) or separately on different integrated circuits.

The radar system 102 also includes one or more processors 110 (e.g., an energy processing unit) and computer-readable storage media (CRM) 112. The processor 110 can be a microprocessor or a system-on-chip. The processor 110 can execute instructions stored in the CRM 112. For example, the processor 110 can process EM energy received by the receiver 108 and determine, using an angle-finding module 114, a location of the object 120 relative to the radar system 102. The processor 110 can also generate radar data for at least one automotive system. For example, the processor 110 can control, based on processed EM energy from the receiver 108, an autonomous or semi-autonomous driving system of the vehicle 104.

The angle-finding module 114 obtains EM energy received by the receiver 108 and uses an angle-finding process 116 to determine azimuth angles and/or elevation angles associated with the object 120. The angle-finding module 114 and the angle-finding process 116 can be implemented as instructions in the CRM 112, hardware, software, or a combination thereof that is executed by the processor 110. Although the receiver 108 includes a sparse 1D or 2D array, the angle-finding process 116 enables the radar system 102 to efficiently process radar data to determine angles associated with the one or more objects 120 without blind spots. In this way, even with fewer antenna elements than a traditional radar system, the radar system 102 and angle-finding process 116 can have a comparable angular resolution at a lower cost and lower complexity level.

The radar system 102 can determine a distance to the object 120 based on the time it takes for the EM signals to travel from the radar system 102 to the object 120, and from the object 120 back to the radar system 102. The radar system 102 can also determine, using the angle-finding module 114 and the angle-finding process 116, a location of the object 120 in terms of an azimuth angle 128 and an elevation angle 130 based on the direction of one or more amplitude peaks in the reflected signal received by the radar system 102.

As an example, FIG. 1 illustrates the vehicle 104 traveling on a road 118. The radar system 102 detects the object 120 in front of the vehicle 104. The radar system 102 can define a coordinate system with an x-axis 122 (e.g., in a forward direction along the road 118), a y-axis 124 (e.g., perpendicular to the x-axis 122 and along a surface of the road 118), and a z-axis 126 (e.g., perpendicular to the surface of the road 118). The radar system 102 can locate the object 120 in terms of the azimuth angle 128 and/or the elevation angle 130. The azimuth angle 128 can represent a horizontal angle from the x-axis 122 to the object 120. The elevation angle 130 can represent a vertical angle from the surface of the road 118 (e.g., a plane defined by the x-axis 122 and the y-axis 124) to the object 120.

The vehicle 104 can also include at least one automotive system that relies on data from the radar system 102, such as a driver-assistance system, an autonomous-driving system, or a semi-autonomous-driving system. The radar system 102 can include an interface to an automotive system that relies on the data. For example, the processor 110 outputs radar data, via the interface, as a signal based on EM energy received by the receiver 108.

Generally, the automotive systems use radar data provided by the radar system 102 to perform a function. For example, the driver-assistance system can provide blind-spot monitoring and generate an alert that indicates a potential collision with the object 120 that is detected by the radar system 102. The radar data from the radar system 102 indicates when it is safe or unsafe to change lanes in such an implementation.

The autonomous-driving system may move the vehicle 104 to a particular location on the road 118 while avoiding collisions with the object 120 detected by the radar system 102. The radar data provided by the radar system 102 can provide information about a distance to and the location of the object 120 to enable the autonomous-driving system to perform emergency braking, perform a lane change, or adjust the speed of the vehicle 104.

FIGS. 2-1 through 2-4 illustrate example sparse uniform antenna arrays of a radar system with an angle-finding process. For example, the radar system can be the radar system 102 of FIG. 1. In the depicted implementation, antennas 200-1, 200-2, 200-3, and 200-4 include a transmitter array 202 and a receiver array 204 that can correspond to the transmitter 106 and the receiver 108, respectively, of FIG. 1.

Figures 1, 2:
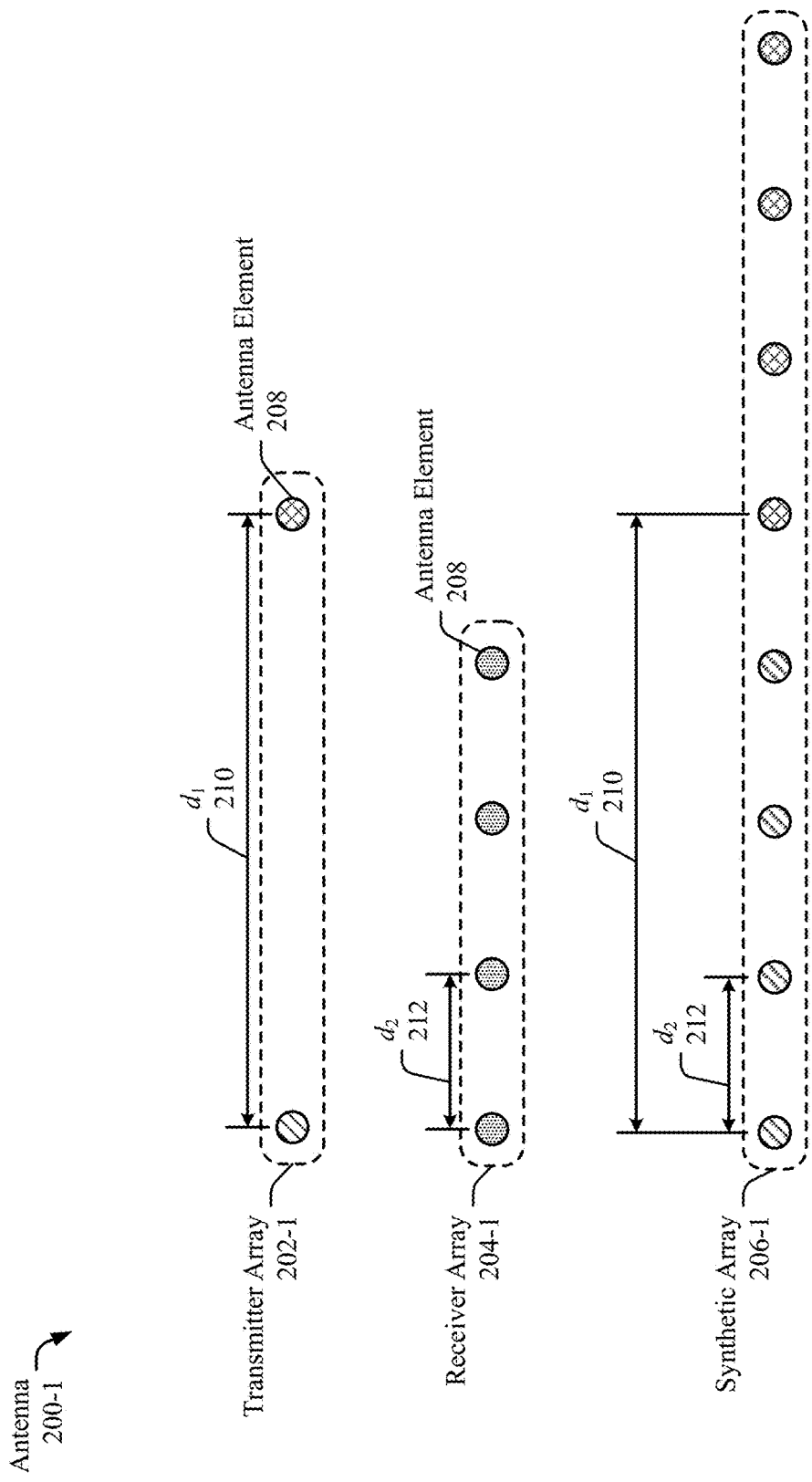
Figure 2:
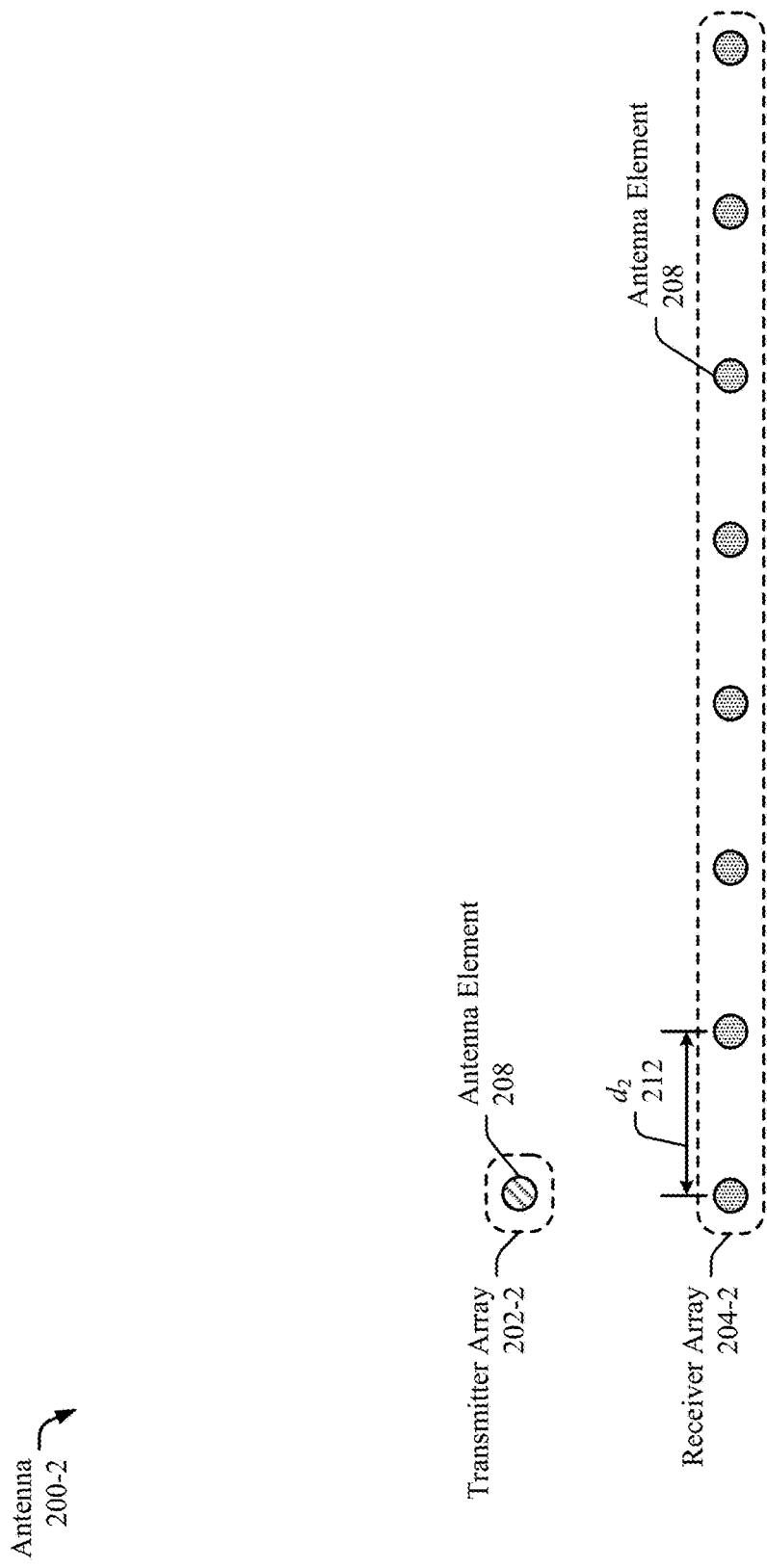
Figures 2, 3:
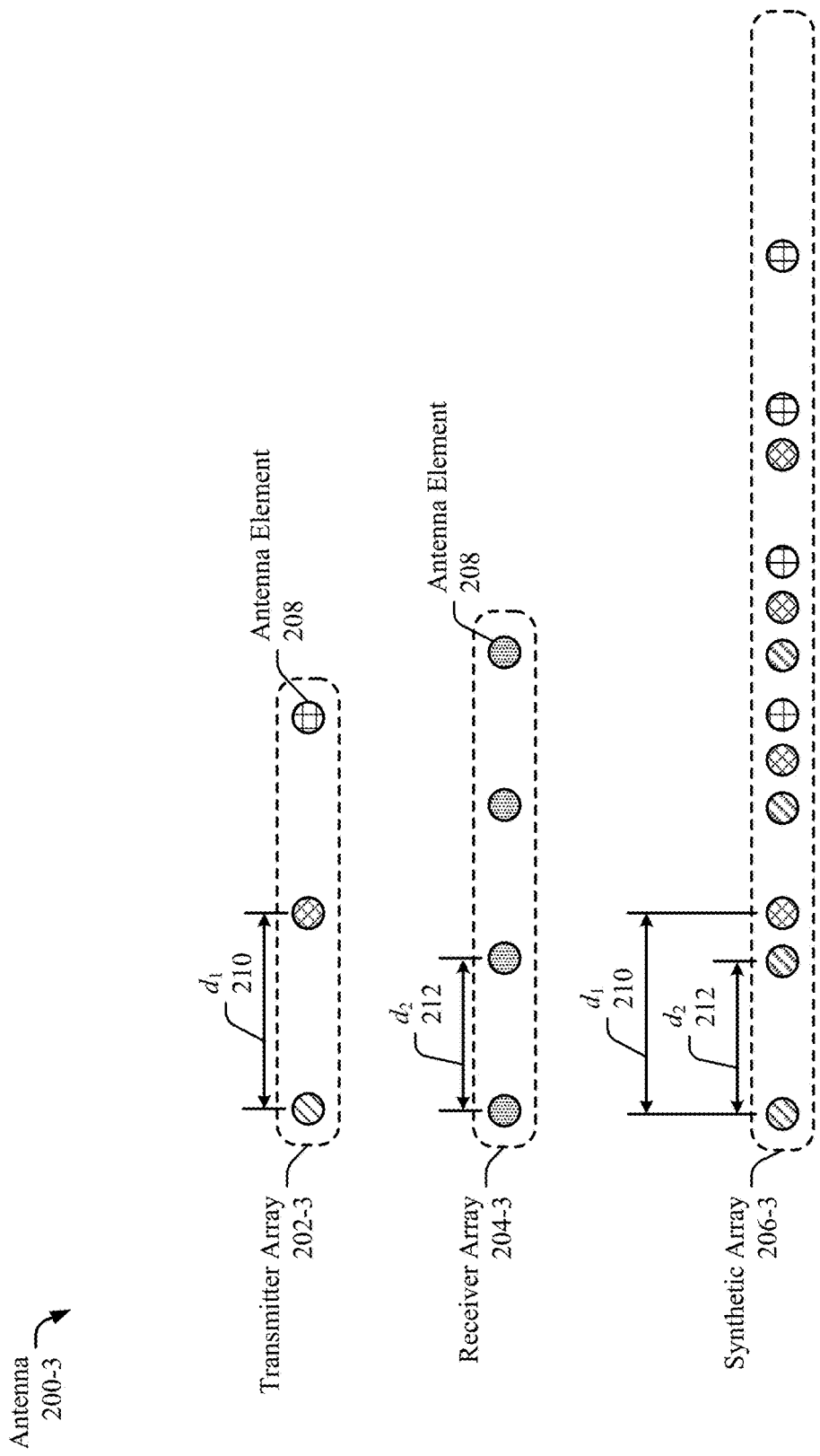
Figures 2, 3, 4:
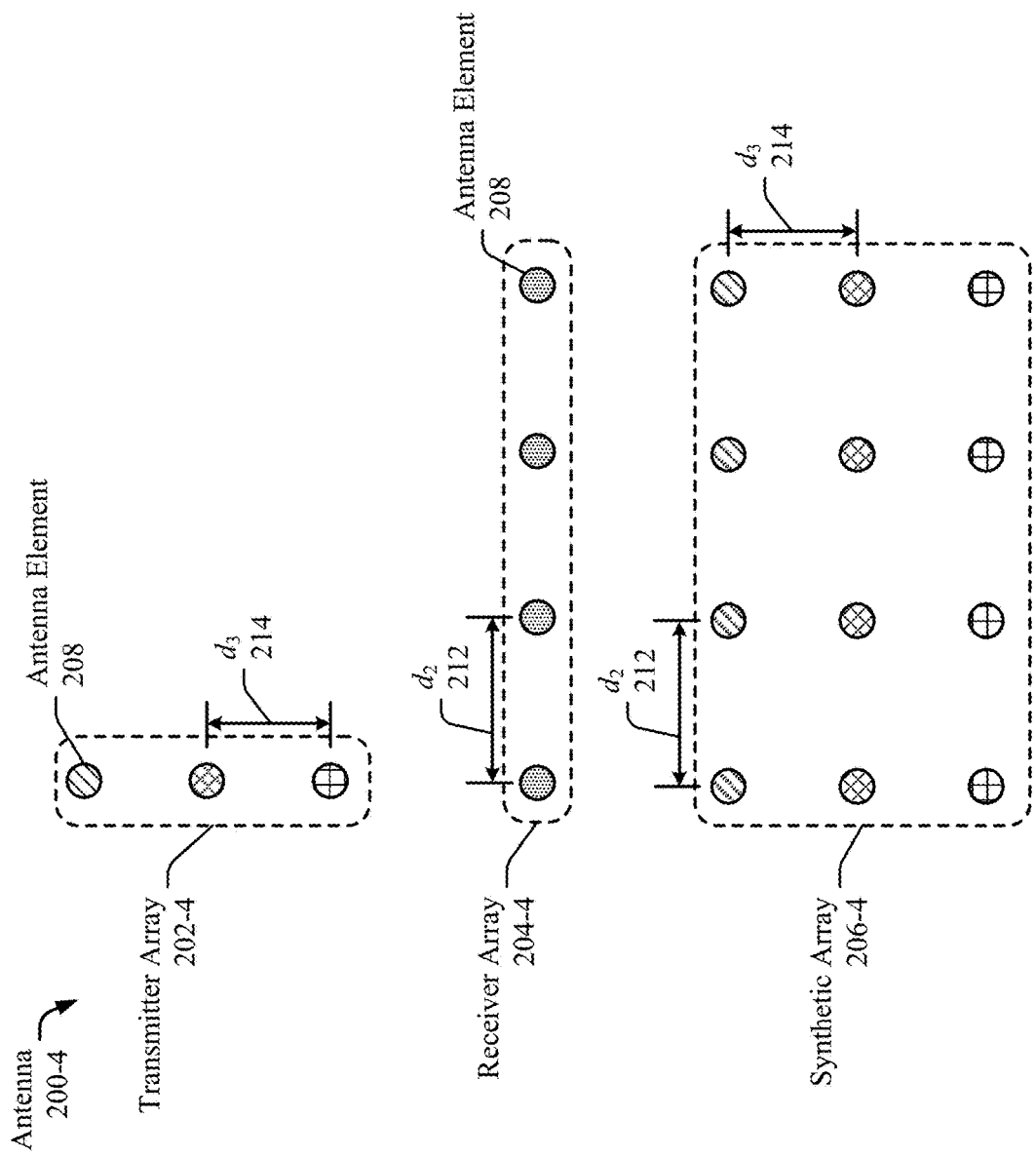
Figure 3:
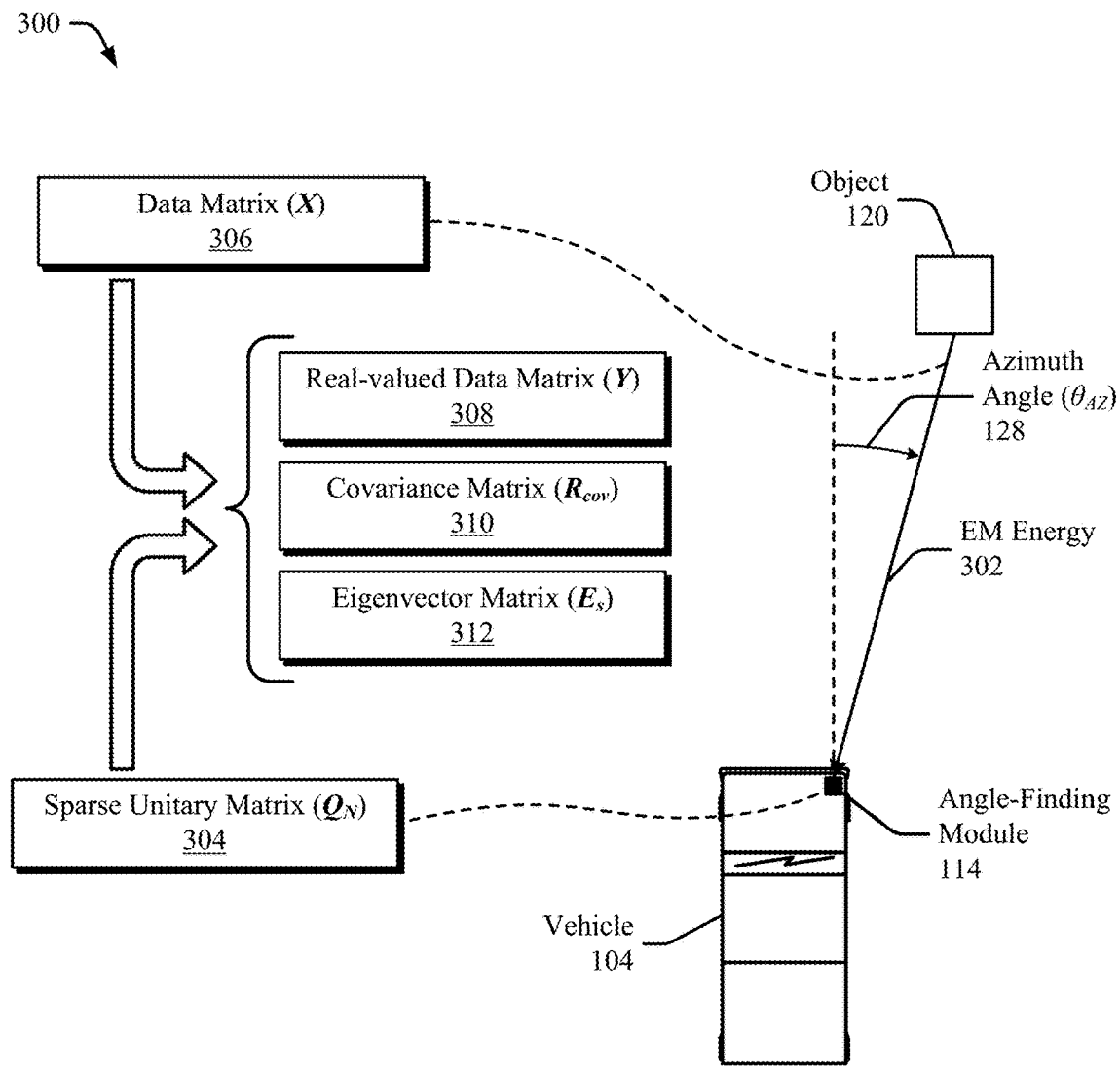
Figure 3:
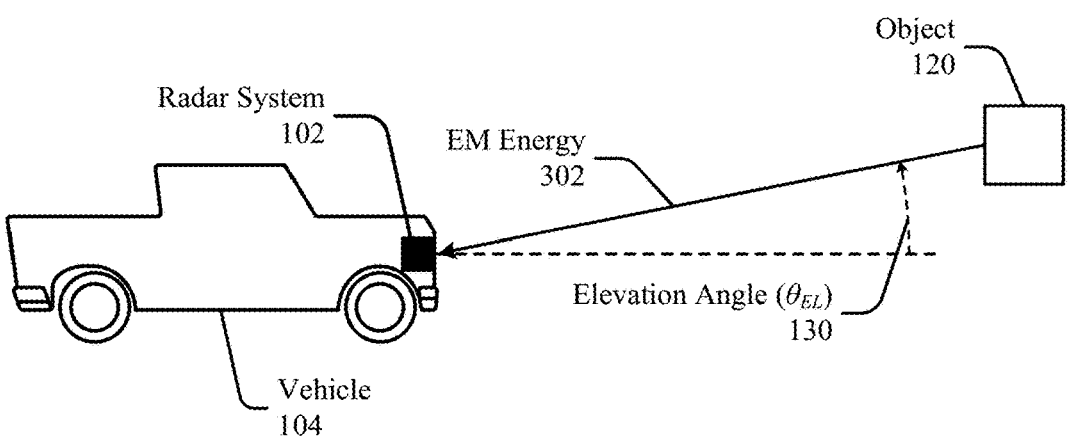
Figure 4:
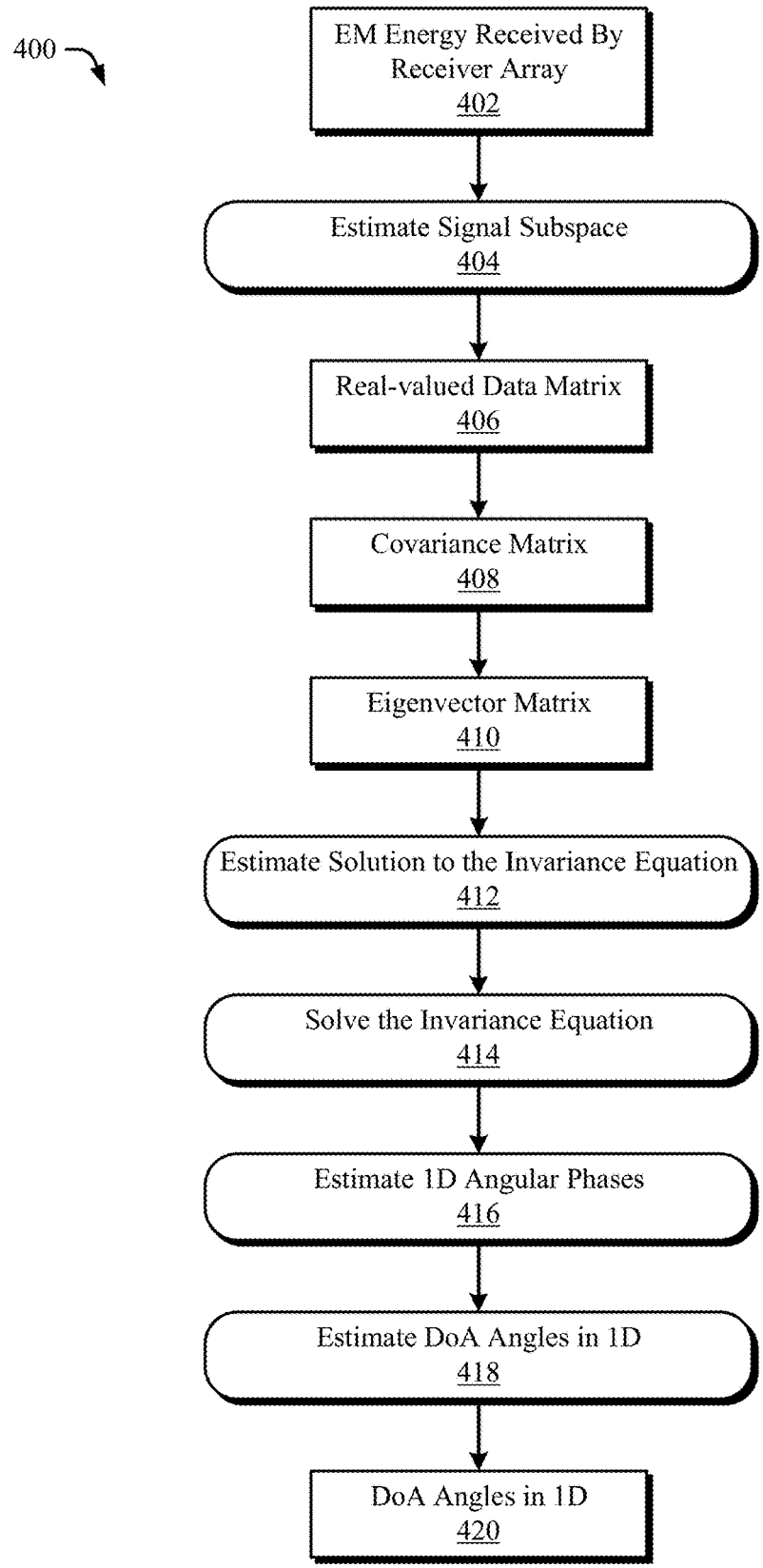

The transmitter array 202 is a sparse uniform linear array that includes $N_T$ antenna elements 208 with first spacing 210, $d_1$, in a first direction (e.g., the azimuth direction), as illustrated in FIGS. 2-1 and 2-3, or a third spacing 214, $d_3$, in a second direction (e.g., the elevation direction), as illustrated in FIG. 2-4. The first spacing 210 and the third spacing 214 can be multiples of 0.5 λ, where λ is the wavelength of the transmitted EM radiation. The transmitter array 202-1 includes two antenna elements 208 (e.g., $N_T$ is equal to two) in the depicted implementation of FIG. 2-1. In FIGS. 2-3 and 2-4, the transmitter arrays 202-3 and 202-4 include three antenna elements. As another example, the transmitter array 202 can include one antenna element 208, as depicted in FIG. 2-2. The transmitter array 202 can also include additional or fewer antenna elements 208 in other implementations. As depicted in FIGS. 2-1 through 2-4, the transmitter array 202 can include antenna elements 208 in the azimuth direction or the elevation direction.

The antenna elements 208 of the transmitter array 202 are separated by a uniform spacing (e.g., the first spacing 210 or the third spacing 214) in the azimuth direction or the elevation direction. For example, the antenna elements 208 can be spaced apart by 2.0 λ (e.g., the first spacing 210 is equal to 2.0 λ), in the azimuth direction. In other implementations, the first spacing 210 or the third spacing 214 can have different values. For example, the first spacing 210 is equal to 4.0 λ, and 2.0 λ for the transmitter array 202-1 and 202-3, respectively. The third spacing 214 is equal to 2.0 λ for the transmitter array 202-4. As depicted in FIGS. 2-1 through 2-4, the transmitter array 202 can be a sparse uniform linear array (ULA) in the azimuth direction or the elevation direction. The transmitter array 202 can also be a sparse uniform 2D array in the azimuth direction and elevation direction.

The receiver array 204 is also a sparse uniform linear array that includes $N_R$ antenna elements 208 with the second spacing 212, $d_2$, in a direction (e.g., azimuth direction or elevation direction). In the depicted implementation of FIG. 2-1, the receiver array 204-1 includes four antenna elements 208 (e.g., $N_R$ is equal to four). The receiver array 204 can also include additional or fewer antenna elements 208 in other implementations as illustrated in FIG. 2-2.

The antenna elements 208 of the receiver array 204 are separated by the second spacing 212 in the azimuth direction in the depicted implementations. For example, the antenna elements 208 can be spaced apart by 1.5 λ in the azimuth direction. The second spacing 212 is equal to 1.0 λ for the receiver array 204-1 and 204-2 and 1.5 λ for the receiver array 204-3 and 204-4. In other words, the receiver array 204 in the depicted implementation is a ULA with a sparse spacing of the antenna elements 208. In other implementations, the second spacing 212 can have different values.

The receiver array 204 can also be a two-dimensional (2D) sparse uniform array that includes N antenna elements 208 in the first direction and M antenna elements in the second direction, where N is equal or not equal to M. The antenna elements 208 of the 2D array are separated by the first spacing 210 in the first direction and by the third spacing 214 in the second direction. The first spacing 212 can be equal to or different from the third spacing 214 for the 2D sparse uniform array. The antenna elements 208 of the 2D sparse array can be arranged in an approximately rectangular shape.

The antenna 200 can support a MIMO radar system and can rely on the sparse arrays of the transmitter array 202 and the receiver array 204 to match the radar returns to the corresponding signals. In other implementations, the radar system can operate as a traditional radar system that does not rely on dynamic MIMO techniques.

The radar system can generate a synthetic array 206 with a minimum spacing of the antenna elements 208 equal to 0.5 λ, allowing angle estimation by the angle-finding module 114 covering −90 degrees to 90 degrees. The synthetic array 206 includes $N_T N_R$ antenna elements 208. In the depicted implementation of FIG. 2-1, the synthetic array 206-1 includes eight antenna elements 208 (e.g., two×four). The antenna elements 208 of the synthetic array 206-1 are spaced apart in a direction (e.g., the azimuth direction) by the first spacing and the second spacing. As another example, the synthetic array 206-3 is a sparse array. The 1D data vector can be converted into a 2D data matrix, which can be considered as an equivalent sparse uniform 2D array with the second spacing 212 in the first direction (e.g., the azimuth direction) and the first spacing 210 in the second direction (e.g., the elevation direction). The angle-finding module 114 can then use the angle-finding process for sparse uniform 2D arrays detailed in FIG. 5.

In automotive applications, the number of antenna elements 208 in the synthetic array 206 can be greater than an anticipated maximum number of objects 120 to be detected by the radar system 102.

In the depicted implementations, the transmitter array 202 and the receiver array 204 are positioned in an azimuth direction. In other implementations, the transmitter array 202 and the receiver array 204 can be positioned in an elevation direction or another direction.

The transmitter array 202 and the receiver array 204 can be planar arrays that provide high gain and low loss. Planar arrays are well-suited for vehicle integration due to their small size. For example, the antenna elements 208 can be slots etched or otherwise formed in a plating material of one PCB surface for a substrate-integrated waveguide (SIW) antenna. The antenna elements 208 can also be part of an aperture antenna, a microstrip antenna, or a dipole antenna. For example, transmitter array 202 and receiver array 204 can include subarrays of patch elements (e.g., microstrip patch antenna subarrays) or dipole elements.

In the depicted implementation, the transmitter array 202 and the receiver array 204 are both sparse arrays. Many radar systems that apply conventional angle-finding processes either cannot determine a solution or have a large estimation error when the objects 120 are at certain angles $$\theta = \sin^{-1}\left(\frac{(1+2k)\lambda}{2d}\right),$$

(e.g., where k is a positive integer and d is the spacing among the antenna elements 208). To address the potential radar blindness at these angles, the described radar system 102 uses a modified angle-finding process that can robustly determine the angle associated with the objects 120 at each angle within the field-of-view of the radar system 102.

FIG. 3 illustrates an example environment 300 in which a radar system uses the angle-finding module 114 to perform an angle-finding process for sparse uniform arrays. The radar system and angle-finding process can, for example, be the radar system 102 and angle-finding process 116 of FIG. 1, respectively.

The radar system includes a 1D or 2D sparse synthetic array (e.g., the synthetic arrays 206). The angle-finding module 114 can generate a sparse unitary matrix QN 304 based on the number of antenna elements 208 in the synthetic array. The generation of the sparse unitary matrix 304 is described in greater detail with respect to FIGS. 4 and 5.

Consider that the radar system transmit EM signals to detect objects. The EM signal is reflected by the object 120. The radar system receives EM energy 302 associated with the reflected EM signal. The angle-finding module 114 can use multiple data snapshots of the EM energy 302 to generate a data matrix X 306. The generation of the data matrix 306 is described in greater detail with respect to FIGS. 4 and 5.

The angle-finding module 114 can then use the angle-finding process 116 to determine, based on the data matrix 306 and the sparse unitary matrix 304, a real-valued data matrix Y 308, covariance matrix $R_{cov}$ 310, and eigenvector matrix $E_s$ 312. The angle-finding module 114 can use the real-value data matrix 308, the covariance matrix 310, and the eigenvector matrix to determine at least one of the azimuth angle $\theta_{AZ}$ 128 or the elevation angle $\theta_{EV}$ 130 associated with the object 120. The angle-finding process 116 is described in greater detail with respect to FIGS. 4 and 5.

FIG. 4 illustrates an example flow diagram 400 of the radar system 102 with an angle-finding process for sparse uniform linear arrays. The radar system 102 of FIG. 4 can, for example, be the radar system 102 of FIG. 1. The radar system 102 can generate a sparse ULA synthetic array (e.g., the synthetic arrays 206-1 or 206-2). The radar system 102 also includes the angle-finding module 114 that uses the angle-finding process 116 to determine DoA angles 420 associated with the objects 120 in a first direction (e.g., the azimuth direction).

Consider that the radar system 102 includes a uniform one-dimensional (1D) or linear synthetic array with N antenna elements 208. The antenna elements 208 of the synthetic array are uniformly spaced apart by a distance d.

At 404, the angle-finding module 114 obtains EM energy 402 received by the 1D synthetic array 206-1 or 206-2 and estimates the signal subspace. The angle-finding process 116 generates an N×N sparse unitary matrix $Q_N$. When N is even (e.g., N=2n, where $n \in \mathbb{Z}^+$), the sparse unitary matrix is provided by Equation (1):

$$Q_N = \frac{1}{\sqrt{2}}\begin{bmatrix} I_n & jI_n \\ J_n & -jJ_n \end{bmatrix} \quad (1)$$

When N is odd (e.g., N=2n+1, where $n \in \mathbb{Z}^+$), the sparse unitary matrix is provided by Equation (2):

$$Q_N = \frac{1}{\sqrt{2}}\begin{bmatrix} I_n & 0_n & jI_n \\ 0_n^T & \sqrt{2} & 0_n^T \\ J_n & 0_n & -jJ_n \end{bmatrix} \quad (2)$$

where $I_n$ is an n×n identity matrix, $J_n$ is an n×n exchange matrix, and $0_n$ is an n×1 zero vector.

The angle-finding module 114 can, using multiple data snapshots of the EM energy 402, generate a beam vector, $x_l$, where l=1, 2, . . . , L, and L is the number of snapshots used by the angle-finding process 116. The angle-finding process 116 can use multiple data snapshots (e.g., L>1), depending on the speed with which the radar system 102 or the vehicle-based systems require the radar data to be processed. The one or more beam vectors are each a complex-valued N×1 vector.

The angle-finding module 114 uses the angle-finding process 116 to generate a data matrix X, which is an N×L matrix represented by Equation (3):

$$X = [x_1, x_2, \ldots, x_L] \quad (3)$$

The angle-finding module 114 can perform a unitary transform on the data matrix X to generate a real-valued data matrix 306, Y. The real-valued data matrix 406 is represented by Equation (4):

$$Y = [\text{Re}\{Q_N^H X\} \text{Im}\{Q_N^H X\}] \quad (4)$$

The angle-finding module 114 can use the real-valued data matrix 406 to generate a covariance matrix 408, $R_{cov}$. The covariance matrix 408 is represented by Equation (5):

$$R_{cov} = \frac{1}{L} YY^H \quad (5)$$

Consider that the number of objects 120 detected by the radar system 102 is P, the angle-finding process 116 can generate an eigenvector matrix 410, $E_s$. The eigenvector matrix 410, $E_s \in \mathbb{R}^{N \times P}$, contains P eigenvectors corresponding to the P largest eigenvalues of the covariance matrix 408.

At 412, the angle-finding module 114 can estimate a solution of the invariance equation. Consider that the angle-finding process 116 generates the following matrices represented by Equations (6) through (8):

$$J_2=[0_{n-1}I_{N-1}] \quad (6)$$

$$K_1=2\text{Re}\{Q_{N-1}{}^H J_2 Q_N\} \quad (7)$$

$$K_2=2\text{Im}\{Q_{N-1}{}^H J_2 Q_N\} \quad (8)$$

The angle-finding module 114 compares the absolute value of several products involving the eigenvector matrix 410. In particular, the angle-finding module 114 can use Equation (9) to determine an estimate of the invariance equation based on a comparison of the determinants of $K_2$ and $K_1$:

$$|(K_2 E_s)^H (K_2 E_s)| > |(K_1 E_s)^H (K_1 E_s)| \quad (9)$$

If the angle-finding module 114 determines that Equation (9) is true, then the angle-finding module 114 estimates the solution of the invariance equation as represented by Equation (10):

$$K_2 E_s \Psi \approx K_1 E_s \quad (10)$$

If the angle-finding module 114 determines that Equation (9) is not true, then the angle-finding module 114 estimates the solution of the invariance equation as represented by Equation (11):

$$K_1 E_s \Psi \approx K_2 E_s \quad (11)$$

At 414, the angle-finding module 114 can solve the corresponding invariance equation and determine $\Psi$ using either a total-least-squares (TLS) or least-squares (LS) method. In general, the TLS method has greater accuracy than the LS method but can have a higher computational cost. If Equation (9) was true, the angle-finding module 114 can determine whether the conditions represented by Equations (12) and (13) are true:

$$|(K_2 E_s)^H (K_2 E_s)| < \sigma \quad (12)$$

$$|(K_2 E_s)^H (K_2 E_s)| < \rho |(K_1 E_s)^H (K_1 E_s)| \quad (13)$$

where $\sigma$ and $\rho$ are a first threshold parameter and a second threshold parameter, respectively. The radar system 102 or the angle-finding module 114 can tune the first and second threshold parameters based on the dimensions of the synthetic array 206 and numerical specifications of the radar system 102 or the vehicle-based systems that use the radar data generated by the radar system 102. For example, the first threshold parameter $\sigma$ can be approximately one hundredth (e.g., $\sigma=10^{-2}$) and the second threshold parameter $\rho$ can be approximately ten (e.g., $\rho=10$).

If both conditions (12) and (13) are true, the angle-finding module 114 can solve $\Psi$ using the TLS method. If either condition (12) or condition (13) is not true, the angle-finding module 114 can solve $\Psi$ using the LS method. In other implementations, the angle-finding module 114 can solve $\Psi$ using the TLS or LS method regardless of whether both conditions (12) and (13) are true.

If Equation (9) was not true, the angle-finding module 114 can determine whether the conditions represented by Equations (14) and (15) are true:

$$|(K_1 E_s)^H (K_1 E_s)| < \sigma \quad (14)$$

$$|(K_1 E_s)^H (K_1 E_s)| < \rho |(K_2 E_s)^H (K_2 E_s)| \quad (15)$$

If both conditions (14) and (15) are true, the angle-finding module 114 can solve $\Psi$ using the TLS method. If either condition (14) or condition (15) is not true, the angle-finding module 114 can solve $\Psi$ using the LS method. In other implementations, the angle-finding module 114 can solve $\Psi$ using the TLS or LS method regardless of whether both conditions (14) and (15) are true.

At 416, the angle-finding module 114 can estimate the 1D angular phases (e.g., the azimuth angular phases) associated with the objects 120. The angle-finding module 114 can calculate the eigenvalues of the matrix $\Psi$ using Equation (16):

$$\Psi = T \Omega T^{-1} \in \mathbb{R}^{P \times P} \text{ with } \Omega = \text{diag}\{\omega_i\}_{i=1}^{P} \quad (16)$$

If the invariance equation at operation 414 is represented by Equation (10), then the angle-finding module 114 can determine the angular phases using Equation (17). If, however, the invariance equation at operation 414 is represented by Equation (11), then the angle-finding module 114 can determine the angular phases using Equation (18).

$$\mu_i = 2 \cot^{-1} \omega_i, i=1,2,\ldots,P \quad (17)$$

$$\mu_i = 2 \tan^{-1} \omega_i, i=1,2,\ldots,P \quad (18)$$

At 418, the angle-finding module 114 can estimate the DoA angles 420 in the first direction (e.g., the azimuth direction) using the angular phase estimates. The angle-finding process 116 can define the relationship between the angular phase and DoA angles using Equation (19):

$$\mu_i + 2k\pi = \frac{2\pi d \sin \theta_i}{\lambda}, \text{ where } k \in \mathbb{Z} \quad (19)$$

where $\lambda$ is the wavelength of the transmitted EM radiation. The angle-finding module 114 can then estimate the DoA angles 420 using Equation (20):

$$\theta_i = \sin^{-1} \frac{(\mu_t + 2k\pi)\lambda}{2\pi d}, \text{ where } k \in \mathbb{Z} \quad (20)$$

In this way, the angle-finding process 116 enables the radar system 102 to process radar data to determine angles associated with the objects 120 without blind spots. If the spacing of the antenna elements 208 is greater than 0.5 $\lambda$ (e.g., a sparse ULA), the angular phase $\mu_i$ for many angle-finding processes (e.g., the unitary ESPRIT algorithm) cannot be equal to positive or negative pi (e.g., $\pm\pi$) because the corresponding angle $\theta_i$ results in a blind spot for the radar system 102 or a large estimation error at these angles. For example, if d is equal to $\lambda$, then the radar system 102 is not able to detect objects at positive or negative thirty degrees. In contrast, the angle-finding process 116 is able to detect objects at each angle within the field-of-view of the synthetic array 206. The angle-finding process 116 also uses the determinant analysis described above to estimate the solution to the invariance equation and adaptively select between the TLS and LS methods to avoid a numerical issue with small determinants.

Figure 5:
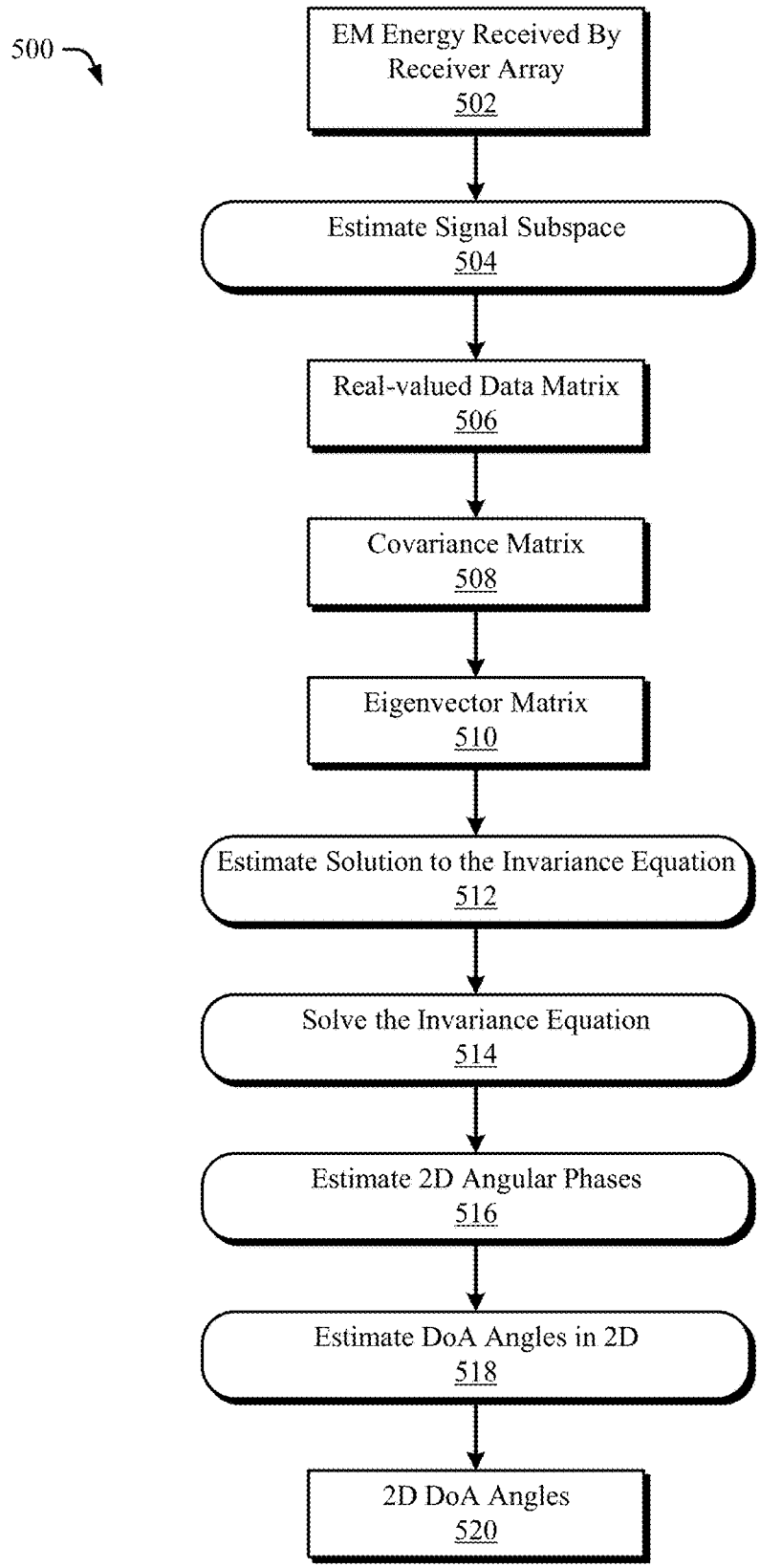
FIG. 5 illustrates an example flow diagram of a radar system with an angle-finding process for sparse uniform 2D arrays.

FIG. 5 illustrates an example flow diagram 500 of the radar system 102 with an angle-finding process for sparse uniform 2D arrays. The radar system 102 of FIG. 5 can, for example, be the radar system 102 of FIG. 1. The radar system 102 includes a sparse uniform 2D synthetic array (e.g., the synthetic array 206-4 or the equivalent 2D synthetic array associated with the synthetic array 206-3). The radar system 102 also includes the angle-finding module 114 that uses the angle-finding process 116 to determine DoA angles 520 (e.g., azimuth angles and elevation angles) associated with the objects 120 in a first direction (e.g., the azimuth direction) and a second direction (e.g., the elevation direction).

Consider that the radar system 102 includes a two-dimensional (2D) uniform synthetic array. The 2D synthetic array includes N antenna elements 208 in the first direction (e.g., the elevation direction) with $d_{EL}$ spacing and M antenna elements 208 in the second direction (e.g., the azimuth direction) with $d_{AZ}$ spacing. The antenna elements 208 of the synthetic array are uniformly spaced apart by a first distance $d_1$ in the first direction and a second distance $d_2$ in the second direction.

At 504, the angle-finding module 114 obtains EM energy 502 received by the 2D synthetic array and estimates the signal subspace. The angle-finding process 116 generates an N×N sparse unitary matrix $Q_N$ and an M×M sparse unitary matrix $Q_M$. When N or M is even (e.g., N=2n, where n ∈ $\mathbb{Z}^+$ or M=2m, where m ∈ $\mathbb{Z}^+$), the sparse unitary matrices are provided by Equations (21a) and (21b):

$$Q_N = \frac{1}{\sqrt{2}}\begin{bmatrix} I_n & jI_n \\ J_n & -jJ_n \end{bmatrix} \quad (21a)$$

$$Q_M = \frac{1}{\sqrt{2}}\begin{bmatrix} I_m & jI_m \\ J_m & -jJ_m \end{bmatrix} \quad (21b)$$

When N or M is odd (e.g., N=2n+1, where n ∈ $\mathbb{Z}^+$ or M=2m+1, where m ∈ $\mathbb{Z}^+$), the sparse unitary matrices are provided by Equations (22a) and (22b):

$$Q_N = \frac{1}{\sqrt{2}}\begin{bmatrix} I_n & 0_n & jI_n \\ 0_n^T & \sqrt{2} & 0_n^T \\ J_n & 0_n & -jJ_n \end{bmatrix} \quad (22a)$$

$$Q_M = \frac{1}{\sqrt{2}}\begin{bmatrix} I_m & 0_m & jI_m \\ 0_m^T & \sqrt{2} & 0_m^T \\ J_m & 0_m & -jJ_m \end{bmatrix} \quad (22b)$$

where $I_n$ is an n×n identity matrix, $I_m$ is an m×m identity matrix, $J_n$ is an n×n exchange matrix, $J_m$ is an m×m exchange matrix, $0_n$ is an n×1 zero vector, and $0_m$ is an m×1 zero vector.

The angle-finding module 114 can, using multiple data snapshots of the EM energy 502, generate a beam vector, $X_l$, where l=1, 2, . . . , L, and L is the number of snapshots used by the angle-finding process 116. The angle-finding process 116 can use two or more data snapshots (e.g., L>1), depending on the speed with which the radar system 102 or the vehicle-based systems require the radar data to be processed. The multiple beam vectors are each a complex-valued N×M matrix.

The angle-finding module 114 uses the angle-finding process 116 to generate a data matrix X, which is an NM×L matrix represented by Equation (23):

$$X=[\text{vec}(X_1), \text{vec}(X_2), \ldots, \text{vec}(X_L)] \quad (23)$$

The angle-finding process 116 can perform a unitary transform on the data matrix X to generate a real-valued data matrix 506, Y. The real-valued data matrix 506 is represented by Equation (24):

$$Y=[\text{Re}\{(Q_M^H \otimes Q_N^H)X\} \text{Im}\{(Q_M^H \otimes Q_N^H)X\}] \quad (24)$$

The angle-finding module 114 can use the real-valued data matrix 506 to generate a covariance matrix 508, $R_{cov}$. The covariance matrix 508 is represented by Equation (25):

$$R_{cov} = \frac{1}{L}YY^H \quad (25)$$

Consider that the number of objects 120 detected by the radar system 102 is P, the angle-finding process 116 can generate an eigenvector matrix 410, $E_s$. The eigenvector matrix 510, $E_s \in \mathbb{R}^{NM \times P}$, contains P eigenvectors corresponding to the P largest eigenvalues of the covariance matrix 508.

At 512, the angle-finding module 114 can estimate a solution of the invariance equation. Consider that the angle-finding process 116 generates the following matrices represented by Equations (26) through (30) for the first dimension (e.g., the elevation dimension):

$$J_2=[0_{N-1}I_{N-1}] \quad (26)$$

$$K_1=\text{Re}\{Q_{N-1}^H J_2 Q_N\} \quad (27)$$

$$K_2=\text{Im}\{Q_{N-1}^H J_2 Q_N\} \quad (28)$$

$$K_{\mu 1}=I_M \otimes K_1 \quad (29)$$

$$K_{\mu 2}=I_M \otimes K_2 \quad (30)$$

The angle-finding module 114 compares the absolute value of several products involving the eigenvector matrix 510. In particular, the angle-finding module 114 can use Equation (31) to determine an estimate of the invariance equation:

$$|(K_{\mu 2}E_s)^H(K_{\mu 2}E_s)|>|(K_{\mu 1}E_s)^H(K_{\mu 1}E_s)| \quad (31)$$

If the angle-finding module 114 determines that Equation (31) is true, then the angle-finding module 114 estimates the solution of the invariance equation as represented by Equation (32):

$$K_{\mu 2}E_s \Psi_\mu \approx K_{\mu 1}E_s \quad (32)$$

If the angle-finding module 114 determines that Equation (31) is not true, then the angle-finding module 114 estimates the solution of the invariance equation as represented by Equation (33):

$$K_{\mu 1}E_s \Psi_\mu \approx K_{\mu 2}E_s \quad (33)$$

Consider that the angle-finding process 116 generates the following matrices represented by Equations (34) through (38) for the second dimension (e.g., the azimuth dimension):

$$J_4=[0_{M-1}I_{M-1}] \quad (34)$$

$$K_3=\text{Re}\{Q_{M-1}^H J_4 Q_m\} \quad (35)$$

$$K_4=\text{Im}\{Q_{M-1}^H J_4 Q_m\} \quad (36)$$

$$K_{\nu 1}=K_3 \otimes I_N \quad (37)$$

$$K_{\nu 2}=K_4 \otimes I_N \quad (38)$$

The angle-finding module 114 compares the absolute value of several products involving the eigenvector matrix 510. In particular, the angle-finding module 114 can use Equation (39) to determine an estimate of the invariance equation:

$$|(K_{\nu 2}E_s)^H(K_{\nu 2}E_s)|>|(K_{\nu 1}E_s)^H(K_{\nu 1}E_s)| \quad (39)$$

If the angle-finding module 114 determines that Equation (39) is true, then the angle-finding module 114 estimates the solution of the invariance equation as represented by Equation (40):

$$K_{\nu 2}E_s \Psi_\nu \approx K_{\nu 1}E_s \quad (40)$$

If the angle-finding module 114 determines that Equation (39) is not true, then the angle-finding module 114 estimates the solution of the invariance equation as represented by Equation (41):

$$K_{v1}E_s\Psi_v \approx K_{v2}E_s \quad (41)$$

At 514, the angle-finding module 114 can solve the corresponding invariance equation and determine $\Psi_\mu$ using either a total-least-squares (TLS) or least-squares (LS) method. If Equation (31) was true, the angle-finding module 114 can determine whether the conditions represented by Equations (42) and (43) are true:

$$|(K_{\mu 2}E_s)^H(K_{\mu 2}E_s)| < \sigma_\mu \quad (42)$$

$$|(K_{\mu 2}E_s)^H(K_{\mu 2}E_s)| < \rho_\mu |(K_{\mu 1}E_s)^H(K_{\mu 1}E_s)| \quad (43)$$

where $\sigma_\mu$ and $\rho_\mu$ are a first threshold parameter and a second threshold parameter, respectively. The radar system 102 or the angle-finding module 114 can tune the first and second threshold parameters based on the dimensions of the synthetic array and numerical specifications of the radar system 102 or the vehicle-based systems that use the radar data generated by the radar system 102. For example, the first threshold parameter $\sigma_\mu$ can be approximately one-hundredth (e.g., $\sigma_\mu = 10^{-2}$) and the second threshold parameter $\rho_\mu$ can be approximately ten (e.g., $\rho_\mu = 10$).

If both conditions (42) and (43) are true, the angle-finding module 114 can solve $\Psi_\mu$ using the TLS method. If either condition (42) or condition (43) is not true, the angle-finding module 114 can solve $\Psi_\mu$ using the LS method.

If Equation (31) was not true, the angle-finding module 114 can determine whether the conditions represented by Equations (44) and (45) are true:

$$|(K_{\mu 1}E_s)^H(K_{\mu 1}E_s)| < \sigma_\mu \quad (44)$$

$$|(K_{\mu 1}E_s)^H(K_{\mu 1}E_s)| < \rho_\mu |(K_{\mu 2}E_s)^H(K_{\mu 2}E_s)| \quad (45)$$

If both conditions (44) and (45) are true, the angle-finding module 114 can solve $\Psi_\mu$ using the TLS method. If either condition (44) or condition (45) is not true, the angle-finding module 114 can solve $\Psi_\mu$ using the LS method.

The angle-finding module 114 can also solve the corresponding invariance equation and determine $\Psi_v$ using either a total-least-squares (TLS) or least-squares (LS) method. If Equation (39) was true, the angle-finding module 114 can determine whether the conditions represented by Equations (46) and (47) are true:

$$|(K_{v2}E_s)^H(K_{v2}E_s)| < \sigma_v \quad (46)$$

$$|(K_{v2}E_s)^H(K_{v2}E_s)| < \rho_v |(K_{v1}E_s)^H(K_{v1}E_s)| \quad (47)$$

where $\sigma_v$ and $\rho_v$ are a first threshold parameter and a second threshold parameter, respectively. The radar system 102 or the angle-finding module 114 can tune the first and second threshold parameters based on the dimensions of the synthetic array and numerical specifications of the radar system 102 or the vehicle-based systems that use the radar data generated by the radar system 102. For example, the first threshold parameter $\sigma_v$ can be approximately one-hundredth (e.g., $\sigma_v = 10^{-2}$) and the second threshold parameter $\rho_v$ can be approximately ten (e.g., $\rho_v = 10$).

If both conditions (46) and (47) are true, the angle-finding module 114 can solve $\Psi_v$ using the TLS method. If either condition (46) or condition (47) is not true, the angle-finding module 114 can solve $\Psi_v$ using the LS method.

If Equation (39) was not true, the angle-finding module 114 can determine whether the conditions represented by Equations (48) and (49) are true:

$$|(K_{v1}E_s)^H(K_{v1}E_s)| < \sigma_v \quad (48)$$

$$|(K_{v1}E_s)^H(K_{v1}E_s)| < \rho_v |(K_{v2}E_s)^H(K_{v2}E_s)| \quad (49)$$

If both conditions (48) and (49) are true, the angle-finding module 114 can solve $\Psi_v$ using the TLS method. If either condition (48) or condition (49) is not true, the angle-finding module 114 can solve $\Psi_v$ using the LS method.

At 516, the angle-finding module 114 can estimate the 2D angular phases (e.g., the azimuth and elevation angular phases) associated with the objects 120. The angle-finding module 114 can calculate the eigenvalues of the complex-valued P×P matrix $\Psi_\mu + j\Psi_v$ using Equation (50):

$$\Psi_\mu + j\Psi_v = T\Omega T^{-1} \text{ with } \Omega = \text{diag}\{\omega_i\}_{i=1}^P \quad (50)$$

For the first dimension (e.g., the elevation dimension), if the invariance equation at operation 514 is represented by Equation (32), then the angle-finding module 114 can determine the elevation angular phases using Equation (51). If, however, the invariance equation at operation 514 is represented by Equation (33), then the angle-finding module 114 can determine the elevation angular phases using Equation (52):

$$\mu_i = 2 \cot^{-1}(\text{Re}\{\omega_i\}), i = 1, 2, \ldots, P \quad (51)$$

$$\mu_i = 2 \tan^{-1}(\text{Re}\{\omega_i\}), i = 1, 2, \ldots, P \quad (52)$$

For the second dimension (e.g., the azimuth dimension), if the invariance equation at operation 514 is represented by Equation (40), then the angle-finding module 114 can determine the azimuth angular phases using Equation (53). If, however, the invariance equation at operation 514 is represented by Equation (41), then the angle-finding module 114 can determine the azimuth angular phases using Equation (54):

$$v_i = 2 \cot^{-1}(\text{Im}\{\omega_i\}), i = 1, 2, \ldots, P \quad (53)$$

$$v_i = 2 \tan^{-1}(\text{Im}\{\omega_i\}), i = 1, 2, \ldots, P \quad (54)$$

At 518, the angle-finding module 114 can estimate the DoA angles 520 in the first direction (e.g., the elevation direction) and the second direction (e.g., the azimuth direction) using the angular phase estimates. The angle-finding process 116 can define the relationship between the angular phases (e.g., the elevation phase $\mu_i$ and the azimuth phase $v_i$) and DoA angles (e.g., the elevation angles $\theta_{EL_i}$ and the azimuth angles $\theta_{AZ_i}$) using Equations (55) and (56):

$$\mu_i + 2k\pi = \frac{2\pi d_{EL} \sin \theta_{EL_i}}{\lambda}, \text{ where } k \in \mathbb{Z} \quad (55)$$

$$v_i + 2k\pi = \frac{2\pi d_{AZ} \sin \theta_{AZ_i}}{\lambda}, \text{ where } k \in \mathbb{Z} \quad (56)$$

where $\lambda$ is the wavelength of the transmitted EM radiation. The angle-finding module 114 can then estimate the DoA angles 520 using Equations (57) and (58):

$$\theta_{EL_i} = \sin^{-1} \frac{(\mu_i + 2k\pi)\lambda}{2\pi d_{EL}}, \text{ where } k \in \mathbb{Z} \quad (57)$$

$$\theta_{AZ_i} = \sin^{-1} \frac{(v_i + 2k\pi)\lambda}{2\pi d_{AZ}}, \text{ where } k \in \mathbb{Z} \quad (58)$$

In this way, the angle-finding module 114 can determine the azimuth angles and the elevation angles associated with the objects 120 with relatively low processing complexity and cost. In addition, the angle-finding process 116 avoids computational blind spots in detecting the objects 120.

Example Method

Figure 6:
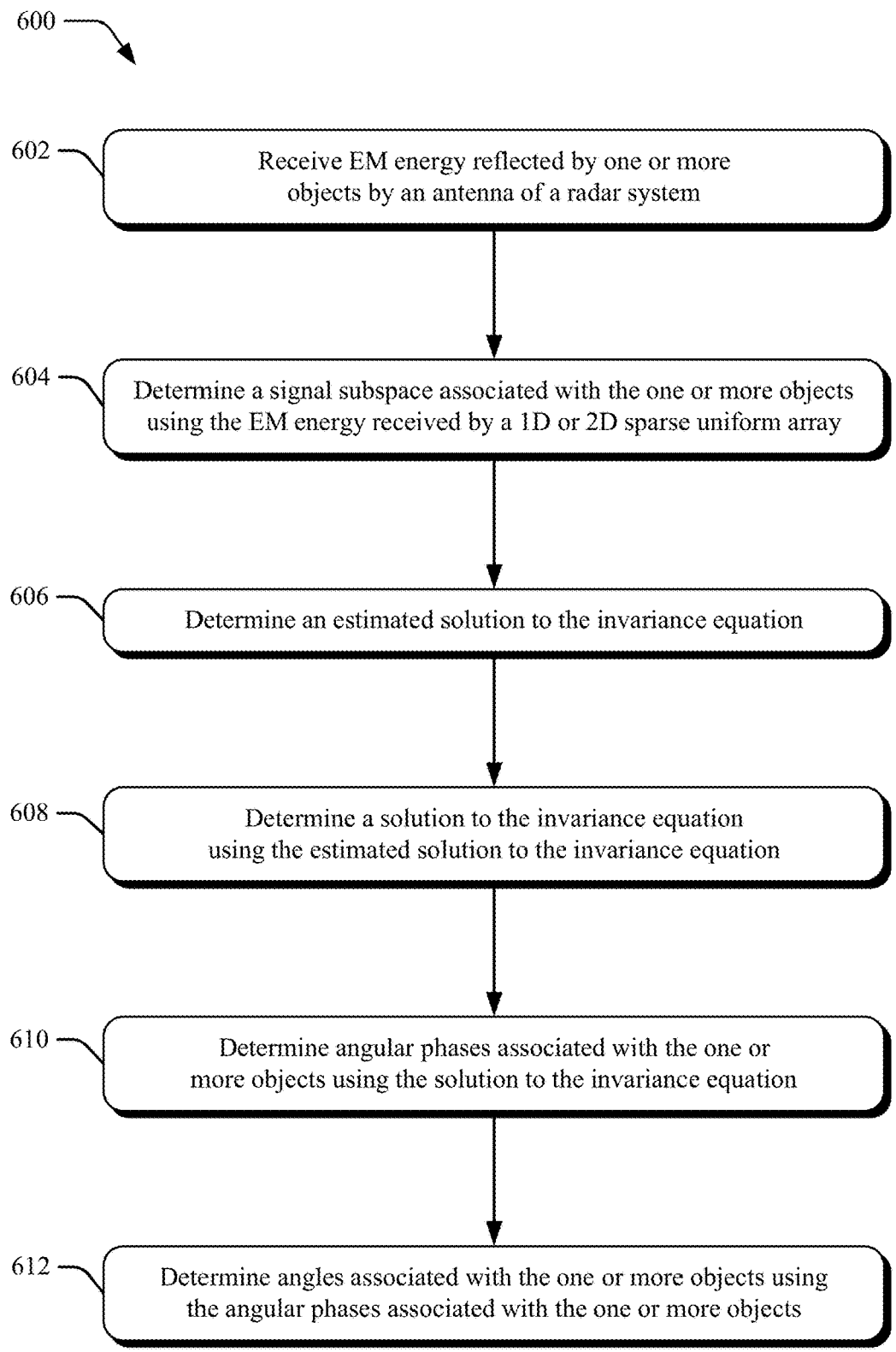
FIG. 6 illustrates an example method of a radar system with an angle-finding process for sparse uniform arrays.

FIG. 6 illustrates an example method 600 of the radar system 102 with an angle-finding process for sparse uniform arrays. Method 600 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environment 100 of FIG. 1, and entities detailed in FIGS. 1 through 5, reference to which is made for example only. The techniques are not limited to performance by one entity or multiple entities.

At 602, EM energy reflected by one or more objects is received by an antenna of a radar system. For example, the antenna 200 of the radar system 102 can receive EM energy reflected by the one or more objects 120.

At 604, a signal subspace associated with the one or more objects using the EM energy received by a 1D or 2D sparse uniform array is determined. The signal subspace includes an invariance equation. For example, the angle-finding module 114 can use the angle-finding process 116 to determine a signal subspace associated with the one or more objects 120. The angle-finding module 114 can use the EM energy received by a 1D or 2D sparse uniform array (e.g., the synthetic array 206). The determination of the signal subspace can include determining the real-valued data matrix 406 or 506, the covariance matrix 408 or 508, and the eigenvector matrix 410 or 510 that are used to define an invariance equation.

At 606, an estimated solution to the invariance equation is determined. For example, the angle-finding module 114 can use the angle-finding process 116 to determine an estimated solution to the invariance equation. The estimated solution can use the eigenvector matrix 410 or 510 and real and imaginary parts of the sparse unitary matrix to determine first and second determinant values. Based on a comparison of the first and second determinant values as described with respect to FIGS. 4 and 5, the angle-finding module 114 can determine the estimated solution to the invariance equation using the eigenvector matrix.

At 608, a solution to the invariance equation is determined using the estimated solution to the invariance equation. For example, the angle-finding module 114 can use the angle-finding process 116 to determine the solution to the invariance equation. As described with respect to FIGS. 4 and 5, the angle-finding module 114 can compare the first determinant or the second determinant to a first threshold and a second threshold and determine whether to use a TLS or LS method to solve the invariance equation.

At 610, angular phases associated with the one or more objects are determined using the solution to the invariance equation. For example, the angle-finding module 114 can use the angle-finding process 116 to determine angular phases associated with the objects 120 as described with respect to FIGS. 4 and 5.

At 612, angles associated with the one or more objects are determined using the angular phases associated with the one or more objects. For example, the angle-finding module 114 can use the angle-finding process 116 to determine azimuth angles and/or elevation angles associated with the objects 120 as described with respect to FIGS. 4 and 5.

EXAMPLES

In the following section, examples are provided.

Example 1: A radar system comprising: an antenna configured to receive electromagnetic (EM) energy reflected by one or more objects, the antenna comprising a one-dimensional (1D) or two-dimensional (2D) sparse uniform array of antenna elements; and one or more processors configured to: determine, using the EM energy received by the 1D or 2D sparse uniform array, a signal subspace associated with the one or more objects, the signal subspace including an invariance equation; determine an estimated solution to the invariance equation; determine, using the estimated solution to the invariance equation, a solution to the invariance equation; determine, using the solution to the invariance equation, angular phases associated with the one or more objects; and determine, using the angular phases associated with the one or more objects, angles associated with the one or more objects.

Example 2: The radar system of example 1, wherein: the 1D sparse uniform array comprises a uniform linear array positioned in an azimuth direction; and the angles associated with the one or more objects comprise azimuth angles associated with the one or more objects.

Example 3: The radar system of example 1, wherein: the 2D sparse uniform array is positioned in an elevation direction and an azimuth direction; and the angles associated with the one or more objects comprises elevation angles and azimuth angles associated with the one or more objects.

Example 4: The radar system of example 1, wherein the antenna elements of the 1D or 2D sparse uniform array are uniformly spaced apart by at least one of a first distance in an azimuth direction or a second distance in an elevation direction.

Example 5: The radar system of example 4, wherein the first distance and the second distance are a first and a second positive integer of a half of a wavelength of the EM energy.

Example 6: The radar system of example 1, wherein the angles associated with the one or more objects are determined without one or more blind spots within a field-of-view of the 1D or 2D sparse uniform array.

Example 7: The radar system of example 1, wherein the one or more processors, in determining the signal subspace associated with the one or more objects, are configured to: generate a beam vector for each of multiple data snapshots of the EM energy received by the 1D or 2D sparse array; generate, using the beam vector for each of the multiple data snapshots, a data matrix; generate, using the data matrix, a real-valued data matrix; determine, using the real-valued data matrix, a covariance matrix; and determine, using the covariance matrix, an eigenvector matrix, the eigenvector matrix including a first number of eigenvectors corresponding to the first number of largest eigenvalues of the covariance matrix, the first number being equal to a second number of the one or more objects detected by the radar system.

Example 8: The radar system of example 7, wherein the one or more processors, in determining the estimated solution to the invariance equation, are configured to: determine, using the eigenvector matrix and real parts of a sparse unitary matrix, a first determinant value; determine, using the eigenvector matrix and imaginary parts of the sparse unitary matrix, a second determinant value; determine whether the first determinant value is larger or not larger than the second determinant value; and responsive to the second determinant value being larger than the first determinant value, determine the estimated solution to the invariance equation as a product of the eigenvector matrix and the real parts of the sparse unitary matrix; or responsive to the second determinant value not being larger than the first determinant value, determine the estimated solution to the invariance equation as a product of the eigenvector matrix and the imaginary parts of the sparse unitary matrix.

Example 9: The radar system of example 8, wherein the one or more processors, in determining the solution to the invariance equation, are configured to: responsive to the second determinant value being larger than the first determinant value: determine whether a first condition is satisfied, the first condition being whether the second determinant is smaller than a first threshold; determine whether a second condition is satisfied, the second condition being whether the second determinant is smaller than a product of a second threshold and the first determinant; and responsive to both the first condition and the second condition being satisfied, solve the invariance equation using a total least-square method; or responsive to either the first condition or the second condition not being satisfied, solve the invariance equation using a least-square method; and responsive to the second determinant value not being larger than the first determinant value: determine whether a third condition is satisfied, the third condition being whether the first determinant is smaller than the first threshold; determine whether a fourth condition is satisfied, the fourth condition being whether the first determinant is smaller than a product of the second threshold and the second determinant; and responsive to both the third condition and the fourth condition being satisfied, solve the invariance equation using the total least-square method; or responsive to either the third condition or the fourth condition not being satisfied, solve the invariance equation using the least-square method.

Example 10: The radar system of example 9, wherein the one or more processors, in determining the angular phases associated with the one or more objects, are configured to: determine eigenvalues of the solution to the invariance equation; and responsive to the second determinant value being larger than the first determinant value, determine the angular phases as inverse cotangents of the eigenvalues of the solution to the invariance equation; or responsive to the second determinant value not being larger than the first determinant value, determine the angular phases as inverse tangents of the eigenvalues of the solution to the invariance equation.

Example 11: The radar system of example 10, wherein the angles associated with the one or more objects are a function of the angular phases associated with the one or more objects, a wavelength of the EM energy, and a distance between the antenna elements of the 1D or 2D sparse uniform array.

Example 12: The radar system of example 1, wherein the angles associated with the one or more objects are determined using an Estimation of Signal Parameters via Rotational Invariance Technique (ESPRIT) process.

Example 13: The radar system of example 1, wherein the radar system is configured to be installed on an automobile.

Example 14: A method comprising: receiving, by an antenna of a radar system, electromagnetic (EM) energy reflected by one or more objects; determining, using the EM energy received by a one-dimensional (1D) or two-dimensional (2D) sparse uniform array of antenna elements, a signal subspace associated with the one or more objects, the signal subspace including an invariance equation; determining an estimated solution to the invariance equation; determining, using the estimated solution to the invariance equation, a solution to the invariance equation; determining, using the solution to the invariance equation, angular phases associated with the one or more objects; and determining, using the angular phases associated with the one or more objects, angles associated with the one or more objects.

Example 15: The method of example 14, wherein determining the signal subspace associated with the one or more objects comprises: generating a beam vector for each of multiple data snapshots of the EM energy received by the 1D or 2D sparse uniform array; generating, using the beam vector for each of the multiple data snapshots, a data matrix; generating, using the data matrix, a real-valued data matrix; determining, using the real-valued data matrix, a covariance matrix; and determining, using the covariance matrix, an eigenvector matrix, the eigenvector matrix including a first number of eigenvectors corresponding to the first number of largest eigenvalues of the covariance matrix, the first number being equal to a second number of the one or more objects detected by the radar system.

Example 16: The method of example 15, wherein determining the estimated solution to the invariance equation comprises: determining, using the eigenvector matrix and real parts of a sparse unitary matrix, a first determinant value; determining, using the eigenvector matrix and imaginary parts of the sparse unitary matrix, a second determinant value; determining whether the first determinant value is larger or not larger than the second determinant value; and responsive to the second determinant value being larger than the first determinant value, determining the estimated solution to the invariance equation as a product of the eigenvector matrix and the real parts of the sparse unitary matrix; or responsive to the second determinant value not being larger than the first determinant value, determining the estimated solution to the invariance equation as a product of the eigenvector matrix and the imaginary parts of the sparse unitary matrix.

Example 17: The method of example 16, wherein determining the solution to the invariance equation comprises: responsive to the second determinant value being larger than the first determinant value: determining whether a first condition is satisfied, the first condition being whether the second determinant is smaller than a first threshold; determining whether a second condition is satisfied, the second condition being whether the second determinant is smaller than a product of a second threshold and the first determinant; and responsive to both the first condition and the second condition being satisfied, solving the invariance equation using a total least-square method; or responsive to either the first condition or the second condition not being satisfied, solving the invariance equation using a least-square method; and responsive to the second determinant value not being larger than the first determinant value: determining whether a third condition is satisfied, the third condition being whether the first determinant is smaller than the first threshold; determining whether a fourth condition is satisfied, the fourth condition being whether the first determinant is smaller than a product of the second threshold and the second determinant; and responsive to both the third condition and the fourth condition being satisfied, solving the invariance equation using the total least-square method; or responsive to either the third condition or the fourth condition not being satisfied, solving the invariance equation using the least-square method.

Example 18: The method of example 17, wherein determining the angular phases associated with the one or more objects comprises: determining eigenvalues of the solution to the invariance equation; and responsive to the second determinant value being larger than the first determinant value, determining the angular phases as inverse cotangents of the eigenvalues of the solution to the invariance equation; or responsive to the second determinant value not being larger than the first determinant value, determining the angular phases as inverse tangents of the eigenvalues of the solution to the invariance equation.

Example 19: The method of example 18, wherein the angles associated with the one or more objects are a function of the angular phases associated with the one or more objects, a wavelength of the EM energy, and a distance between the antenna elements of the 1D or 2D sparse uniform array.

Example 20: A computer-readable storage media comprising computer-executable instructions that, when executed, cause a processor of a radar system to: receive, by an antenna of a radar system, electromagnetic (EM) energy reflected by one or more objects; determine, using the EM energy received by a one-dimensional (1D) or two-dimensional (2D) sparse uniform array of antenna elements, a signal subspace associated with the one or more objects, the signal subspace including an invariance equation; determine an estimated solution to the invariance equation; determine, using the estimated solution to the invariance equation, a solution to the invariance equation; determine, using the solution to the invariance equation, angular phases associated with the one or more objects; and determine, using the angular phases associated with the one or more objects, angles associated with the one or more objects.

Conclusion

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A radar system comprising:
an antenna configured to receive electromagnetic (EM) energy reflected by one or more objects, the antenna comprising a one-dimensional (1D) or two-dimensional (2D) sparse uniform array of antenna elements; and
one or more processors configured to:
determine, using the EM energy received by the 1D or 2D sparse uniform array, a signal subspace associated with the one or more objects, the signal subspace including an invariance equation by:
generating a beam vector for each of multiple data snapshots of the EM energy received by the 1D or 2D sparse uniform array;
generating, using the beam vector for each of the multiple data snapshots, a data matrix;
generating, using the data matrix, a real-valued data matrix;
determining, using the real-valued data matrix, a covariance matrix; and
determining, using the covariance matrix, an eigenvector matrix, the eigenvector matrix including a first number of eigenvectors corresponding to the first number of largest eigenvalues of the covariance matrix, the first number being equal to a second number of the one or more objects detected by the radar system;
determine an estimated solution to the invariance equation by:
determining, using the eigenvector matrix and real parts of a sparse unitary matrix, a first determinant value;
determining, using the eigenvector matrix and imaginary parts of the sparse unitary matrix, a second determinant value;
determining whether the first determinant value is larger or not larger than the second determinant value; and
responsive to the second determinant value being larger than the first determinant value, determining the estimated solution to the invariance equation as a product of the eigenvector matrix and the real parts of the sparse unitary matrix; or
responsive to the second determinant value not being larger than the first determinant value, determining the estimated solution to the invariance equation as a product of the eigenvector matrix and the imaginary parts of the sparse unitary matrix;
determine, using the estimated solution to the invariance equation, a solution to the invariance equation by:
responsive to the second determinant value being larger than the first determinant value:
determining whether a first condition is satisfied, the first condition being whether the second determinant is smaller than a first threshold;
determining whether a second condition is satisfied, the second condition being whether the second determinant is smaller than a product of a second threshold and the first determinant; and
responsive to both the first condition and the second condition being satisfied, solving the invariance equation using a total least-square method; or
responsive to either the first condition or the second condition not being satisfied, solving the invariance equation using a least-square method; and
responsive to the second determinant value not being larger than the first determinant value:
determining whether a third condition is satisfied, the third condition being whether the first determinant is smaller than the first threshold;
determining whether a fourth condition is satisfied, the fourth condition being whether the first determinant is smaller than a product of the second threshold and the second determinant; and
responsive to both the third condition and the fourth condition being satisfied, solving the invariance equation using the total least-square method; or
responsive to either the third condition or the fourth condition not being satisfied, solving the invariance equation using the least-square method;
determine, using the solution to the invariance equation, angular phases associated with the one or more objects; and
determine, using the angular phases associated with the one or more objects, angles associated with the one or more objects.

2. The radar system of claim 1, wherein:
the 1D sparse uniform array comprises a uniform linear array positioned in an azimuth direction; and the angles associated with the one or more objects comprise azimuth angles associated with the one or more objects.

3. The radar system of claim 1, wherein:
the 2D sparse uniform array is positioned in an elevation direction and an azimuth direction; and
the angles associated with the one or more objects comprises elevation angles and azimuth angles associated with the one or more objects.

4. The radar system of claim 1, wherein the antenna elements of the 1D or 2D sparse uniform array are uniformly spaced apart by at least one of a first distance in an azimuth direction or a second distance in an elevation direction.

5. The radar system of claim 4, wherein the first distance and the second distance are a first and a second positive integer of a half of a wavelength of the EM energy.

6. The radar system of claim 1, wherein the one or more processors, in determining the angular phases associated with the one or more objects, are configured to:
determine eigenvalues of the solution to the invariance equation; and
responsive to the second determinant value being larger than the first determinant value, determine the angular phases as inverse cotangents of the eigenvalues of the solution to the invariance equation; or
responsive to the second determinant value not being larger than the first determinant value, determine the angular phases as inverse tangents of the eigenvalues of the solution to the invariance equation.

7. The radar system of claim 6, wherein the angles associated with the one or more objects are a function of the angular phases associated with the one or more objects, a wavelength of the EM energy, and a distance between the antenna elements of the 1D or 2D sparse uniform array.

8. The radar system of claim 1, wherein the angles associated with the one or more objects are determined using an Estimation of Signal Parameters via Rotational Invariance Technique (ESPRIT) process.

9. The radar system of claim 1, wherein the radar system is configured to be installed on an automobile.

10. A method comprising:
receiving, by an antenna of a radar system, electromagnetic (EM) energy reflected by one or more objects;
determining, using the EM energy received by a one-dimensional (1D) or two-dimensional (2D) sparse uniform array of antenna elements, a signal subspace associated with the one or more objects, the signal subspace including an invariance equation by:
generating a beam vector for each of multiple data snapshots of the EM energy received by the 1D or 2D sparse uniform array;
generating, using the beam vector for each of the multiple data snapshots, a data matrix;
generating, using the data matrix, a real-valued data matrix;
determining, using the real-valued data matrix, a covariance matrix; and
determining, using the covariance matrix, an eigenvector matrix, the eigenvector matrix including a first number of eigenvectors corresponding to the first number of largest eigenvalues of the covariance matrix, the first number being equal to a second number of the one or more objects detected by the radar system;
determine an estimated solution to the invariance equation by:
determining, using the eigenvector matrix and real parts of a sparse unitary matrix, a first determinant value;
determining, using the eigenvector matrix and imaginary parts of the sparse unitary matrix, a second determinant value;
determining whether the first determinant value is larger or not larger than the second determinant value; and
responsive to the second determinant value being larger than the first determinant value, determining the estimated solution to the invariance equation as a product of the eigenvector matrix and the real parts of the sparse unitary matrix; or
responsive to the second determinant value not being larger than the first determinant value, determining the estimated solution to the invariance equation as a product of the eigenvector matrix and the imaginary parts of the sparse unitary matrix;
determining an estimated solution to the invariance equation by:
determining, using the eigenvector matrix and real parts of a sparse unitary matrix, a first determinant value;
determining, using the eigenvector matrix and imaginary parts of the sparse unitary matrix, a second determinant value;
determining whether the first determinant value is larger or not larger than the second determinant value; and
responsive to the second determinant value being larger than the first determinant value, determining the estimated solution to the invariance equation as a product of the eigenvector matrix and the real parts of the sparse unitary matrix; or
responsive to the second determinant value not being larger than the first determinant value, determining the estimated solution to the invariance equation as a product of the eigenvector matrix and the imaginary parts of the sparse unitary matrix;
determining, using the estimated solution to the invariance equation, a solution to the invariance equation by:
responsive to the second determinant value being larger than the first determinant value:
determining whether a first condition is satisfied, the first condition being whether the second determinant is smaller than a first threshold;
determining whether a second condition is satisfied, the second condition being whether the second determinant is smaller than a product of a second threshold and the first determinant; and
responsive to both the first condition and the second condition being satisfied, solving the invariance equation using a total least-square method; or
responsive to either the first condition or the second condition not being satisfied, solving the invariance equation using a least-square method; and
responsive to the second determinant value not being larger than the first determinant value:
determining whether a third condition is satisfied, the third condition being whether the first determinant is smaller than the first threshold;
determining whether a fourth condition is satisfied, the fourth condition being whether the first determinant is smaller than a product of the second threshold and the second determinant; and responsive to both the third condition and the fourth condition being satisfied, solving the invariance equation using the total least-square method; or responsive to either the third condition or the fourth condition not being satisfied, solving the invariance equation using the least-square method;

determining, using the solution to the invariance equation, angular phases associated with the one or more objects; and determining, using the angular phases associated with the one or more objects, angles associated with the one or more objects.

11. The method of claim 10, wherein determining the angular phases associated with the one or more objects comprises:

determining eigenvalues of the solution to the invariance equation; and responsive to the second determinant value being larger than the first determinant value, determining the angular phases as inverse cotangents of the eigenvalues of the solution to the invariance equation; or responsive to the second determinant value not being larger than the first determinant value, determining the angular phases as inverse tangents of the eigenvalues of the solution to the invariance equation.

12. The method of claim 11, wherein the angles associated with the one or more objects are a function of the angular phases associated with the one or more objects, a wavelength of the EM energy, and a distance between the antenna elements of the 1D or 2D sparse uniform array.

13. Non-transitory computer-readable storage media comprising computer-executable instructions that, when executed, cause a processor of a radar system to:

receive, by an antenna of a radar system, electromagnetic (EM) energy reflected by one or more objects;

determine, using the EM energy received by a one-dimensional (1D) or two-dimensional (2D) sparse uniform array of antenna elements, a signal subspace associated with the one or more objects, the signal subspace including an invariance equation by:

generating a beam vector for each of multiple data snapshots of the EM energy received by the 1D or 2D sparse uniform array;

generating, using the beam vector for each of the multiple data snapshots, a data matrix;

generating, using the data matrix, a real-valued data matrix;

determining, using the real-valued data matrix, a covariance matrix; and determining, using the covariance matrix, an eigenvector matrix, the eigenvector matrix including a first number of eigenvectors corresponding to the first number of largest eigenvalues of the covariance matrix, the first number being equal to a second number of the one or more objects detected by the radar system;

determine an estimated solution to the invariance equation by:

determining, using the eigenvector matrix and real parts of a sparse unitary matrix, a first determinant value;

determining, using the eigenvector matrix and imaginary parts of the sparse unitary matrix, a second determinant value;

determining whether the first determinant value is larger or not larger than the second determinant value; and responsive to the second determinant value being larger than the first determinant value, determining the estimated solution to the invariance equation as a product of the eigenvector matrix and the real parts of the sparse unitary matrix; or responsive to the second determinant value not being larger than the first determinant value, determining the estimated solution to the invariance equation as a product of the eigenvector matrix and the imaginary parts of the sparse unitary matrix;

determine, using the estimated solution to the invariance equation, a solution to the invariance equation by:

responsive to the second determinant value being larger than the first determinant value:

determining whether a first condition is satisfied, the first condition being whether the second determinant is smaller than a first threshold;

determining whether a second condition is satisfied, the second condition being whether the second determinant is smaller than a product of a second threshold and the first determinant; and responsive to both the first condition and the second condition being satisfied, solving the invariance equation using a total least-square method; or responsive to either the first condition or the second condition not being satisfied, solving the invariance equation using a least-square method; and responsive to the second determinant value not being larger than the first determinant value:

determining whether a third condition is satisfied, the third condition being whether the first determinant is smaller than the first threshold;

determining whether a fourth condition is satisfied, the fourth condition being whether the first determinant is smaller than a product of the second threshold and the second determinant; and responsive to both the third condition and the fourth condition being satisfied, solving the invariance equation using the total least-square method; or responsive to either the third condition or the fourth condition not being satisfied, solving the invariance equation using the least-square method;

determine, using the solution to the invariance equation, angular phases associated with the one or more objects; and determine, using the angular phases associated with the one or more objects, angles associated with the one or more objects.

14. The non-transitory computer-readable storage media of claim 13, wherein:

the 1D sparse uniform array comprises a uniform linear array positioned in an azimuth direction; and the angles associated with the one or more objects comprise azimuth angles associated with the one or more objects.

15. The non-transitory computer-readable storage media of claim 13, wherein:

the 2D sparse uniform array is positioned in an elevation direction and an azimuth direction; and the angles associated with the one or more objects comprises elevation angles and azimuth angles associated with the one or more objects.

16. The non-transitory computer-readable storage media of claim 13, wherein the antenna elements of the 1D or 2D sparse uniform array are uniformly spaced apart by at least one of a first distance in an azimuth direction or a second distance in an elevation direction.

17. The non-transitory computer-readable storage media of claim 16, wherein the first distance and the second distance are a first and a second positive integer of a half of a wavelength of the EM energy.

18. The non-transitory computer-readable storage media of claim 13, wherein the computer-readable storage media comprises additional computer-executable instructions that, when executed, cause the processor of the radar system, in determining the angular phases associated with the one or more objects, to:
   determine eigenvalues of the solution to the invariance equation; and
   responsive to the second determinant value being larger than the first determinant value, determine the angular phases as inverse cotangents of the eigenvalues of the solution to the invariance equation; or
   responsive to the second determinant value not being larger than the first determinant value, determine the angular phases as inverse tangents of the eigenvalues of the solution to the invariance equation.

19. The non-transitory computer-readable storage media of claim 18, wherein the angles associated with the one or more objects are a function of the angular phases associated with the one or more objects, a wavelength of the EM energy, and a distance between the antenna elements of the 1D or 2D sparse uniform array.

20. The non-transitory computer-readable storage media of claim 13, wherein the angles associated with the one or more objects are determined using an Estimation of Signal Parameters via Rotational Invariance Technique (ESPRIT) process.

\* \* \* \* \*